US011441731B2

(12) United States Patent
Grip

(10) Patent No.: US 11,441,731 B2
(45) Date of Patent: Sep. 13, 2022

(54) PRESSURE VESSEL HAVING SUBSTANTIALLY FLAT PANEL

(71) Applicant: The Boeing Company, Chicago, IL (US)

(72) Inventor: Robert Erik Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 16/459,493

(22) Filed: Jul. 1, 2019

(65) Prior Publication Data

US 2021/0003252 A1   Jan. 7, 2021

(51) Int. Cl.
*F17C 1/00* (2006.01)
*B64C 1/00* (2006.01)

(52) U.S. Cl.
CPC .................. *F17C 1/00* (2013.01); *B64C 1/00* (2013.01); *F17C 2201/0119* (2013.01); *F17C 2201/0147* (2013.01); *F17C 2203/0602* (2013.01); *F17C 2223/013* (2013.01); *F17C 2223/0123* (2013.01); *F17C 2260/011* (2013.01); *F17C 2270/0189* (2013.01)

(58) Field of Classification Search
CPC .. B64C 1/00; B64C 1/068; B65D 7/44; F17C 1/00
USPC ..... 244/36, 120, 119; 220/560.11, 581, 628, 220/650, 646, 218, 216; 206/0.6; 248/674
See application file for complete search history.

(56) References Cited

U.S. PATENT DOCUMENTS

| 2,008,836 | A | * | 7/1935 | Ronan | B64C 1/068 |
| | | | | | 244/119 |
| 2,905,352 | A | * | 9/1959 | Henry | F17C 13/082 |
| | | | | | 220/560.07 |
| 3,951,362 | A | * | 4/1976 | Robinson | B64D 37/06 |
| | | | | | 220/560.07 |
| 5,062,589 | A | | 11/1991 | Roth | |

(Continued)

FOREIGN PATENT DOCUMENTS

DE        3017336        11/1981

OTHER PUBLICATIONS

EPO, European Search Report for appl. No. EP20183439, dated Nov. 25, 2020.

(Continued)

*Primary Examiner* — Robert J Hicks

(57) ABSTRACT

A pressure vessel includes at least one pair of side bulkheads spaced apart from each other. In addition, the pressure vessel includes at least one substantially flat panel having at least one panel span extending between the pair of side bulkheads and being in non-contacting proximity to the side bulkheads. The panel and the side bulkheads collectively form at least a portion of a structural assembly enclosing the pressure vessel. The pressure vessel also includes a plurality of panel braces coupling the side bulkheads to the panel at a plurality of panel attachment nodes distributed along the panel span. At least two of the panel braces have a different axial stiffness configured to result in the outward deflection of the panel attachment nodes by substantially equal deflection amounts when the panel is subjected to an out-of-plane pressure load during internal pressurization of the pressure vessel.

20 Claims, 20 Drawing Sheets

(56) References Cited

U.S. PATENT DOCUMENTS

| | | |
|---|---|---|
| 5,823,468 A | 10/1998 | Bothe |
| 5,893,535 A | 4/1999 | Hawley |
| 7,093,798 B2 | 8/2006 | Whelan et al. |
| 8,366,050 B2 | 2/2013 | Odle et al. |
| 2004/0195454 A1 | 10/2004 | Page et al. |
| 2009/0230238 A1 | 9/2009 | Goos |
| 2018/0370611 A1* | 12/2018 | Guering ................ B64D 27/20 |
| 2019/0185133 A1 | 6/2019 | Badger |

OTHER PUBLICATIONS

Wikipedia, "Boeing_X-48," retrieved on Feb. 6, 2019.
NASA, "Data Sheet on Blended Wing Body aircraft," retrieved on Dec. 21, 2018.

\* cited by examiner

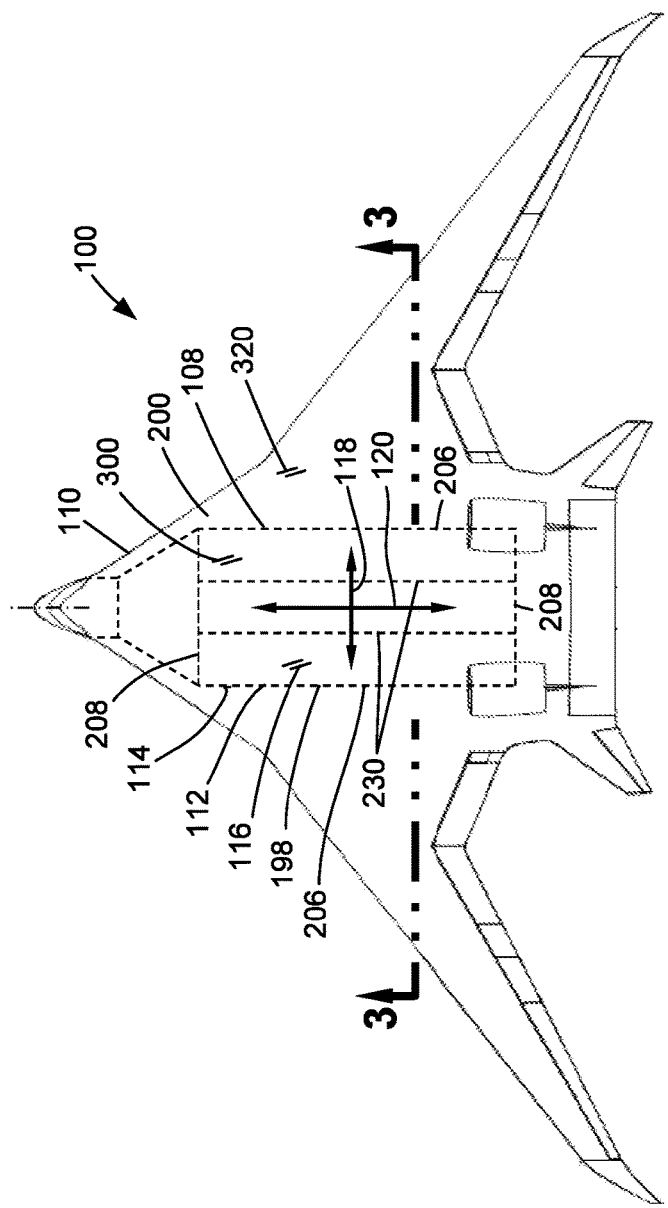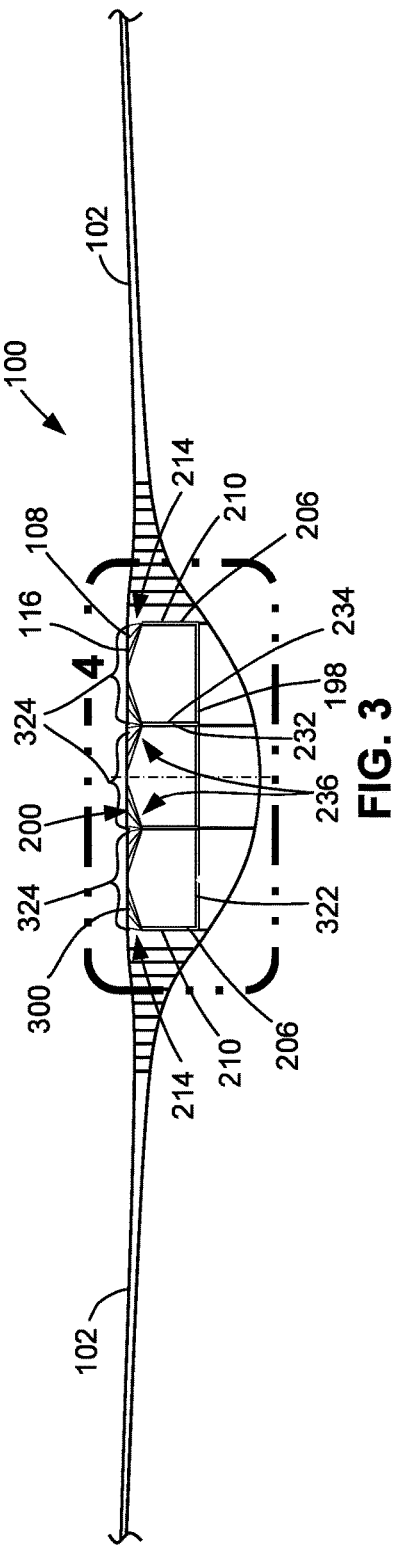

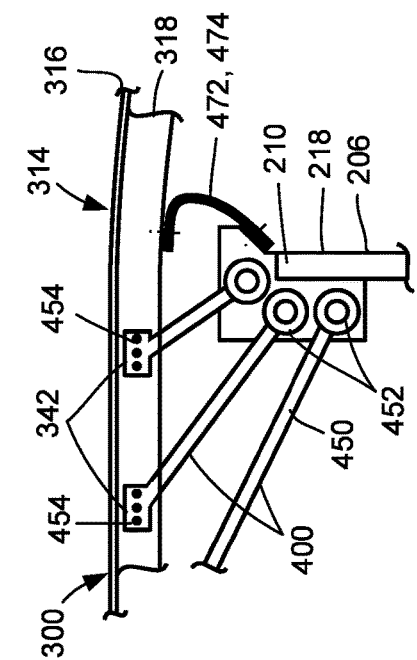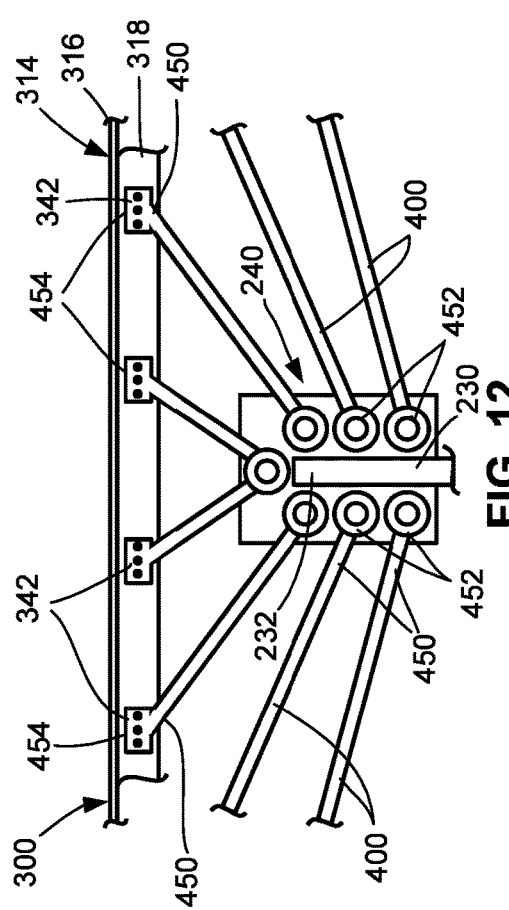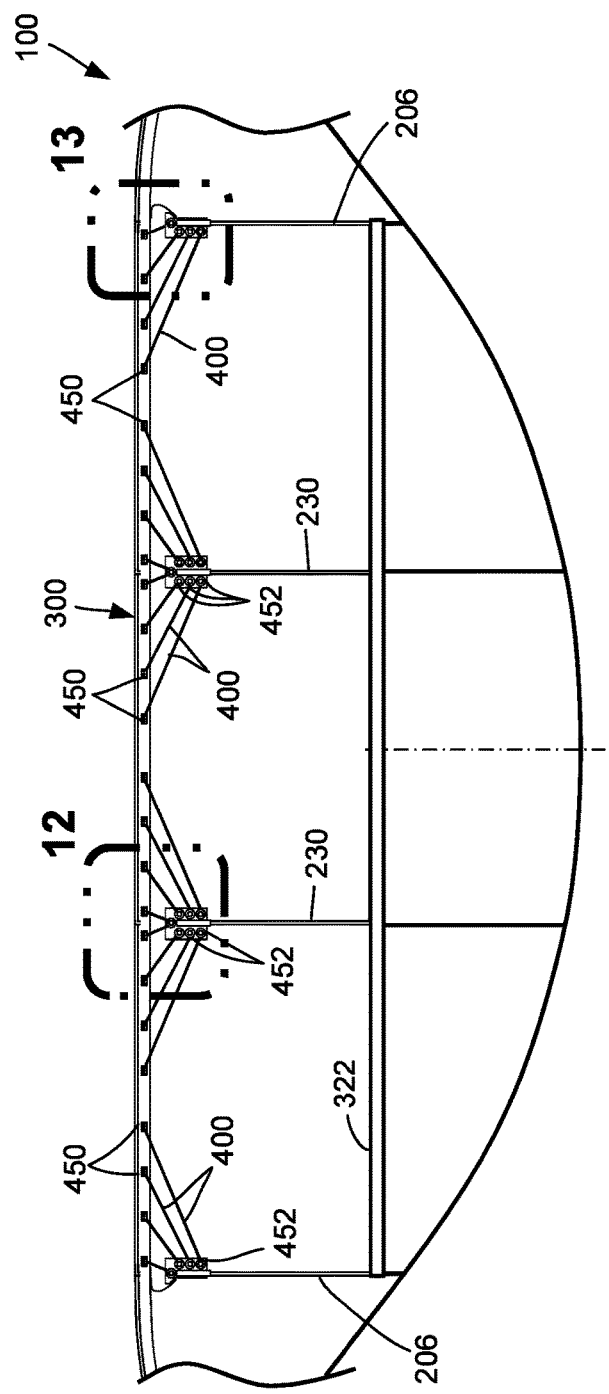

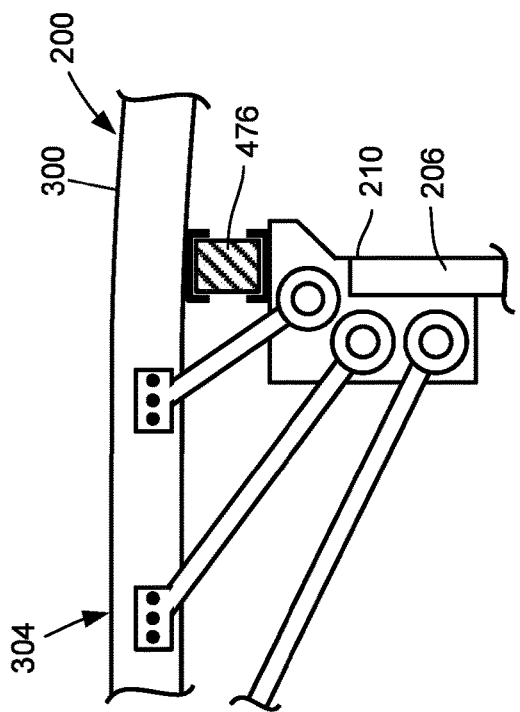
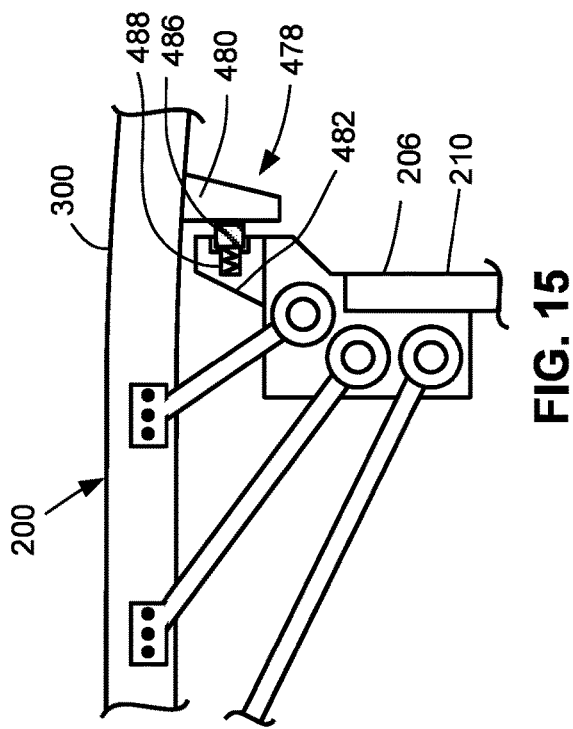
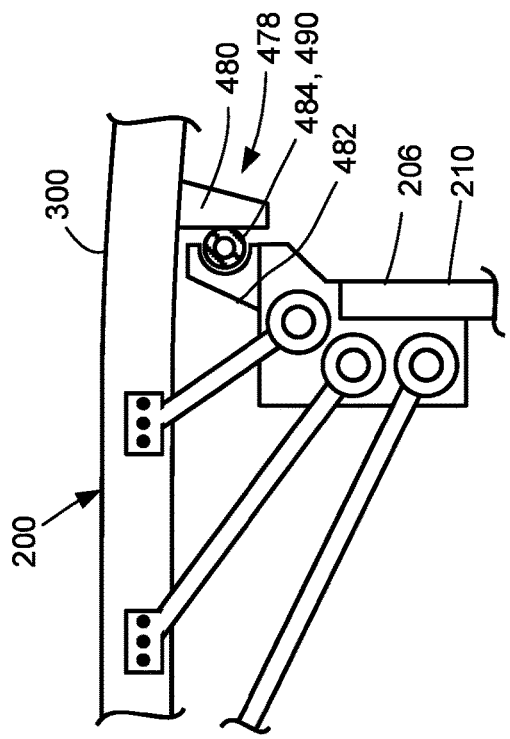

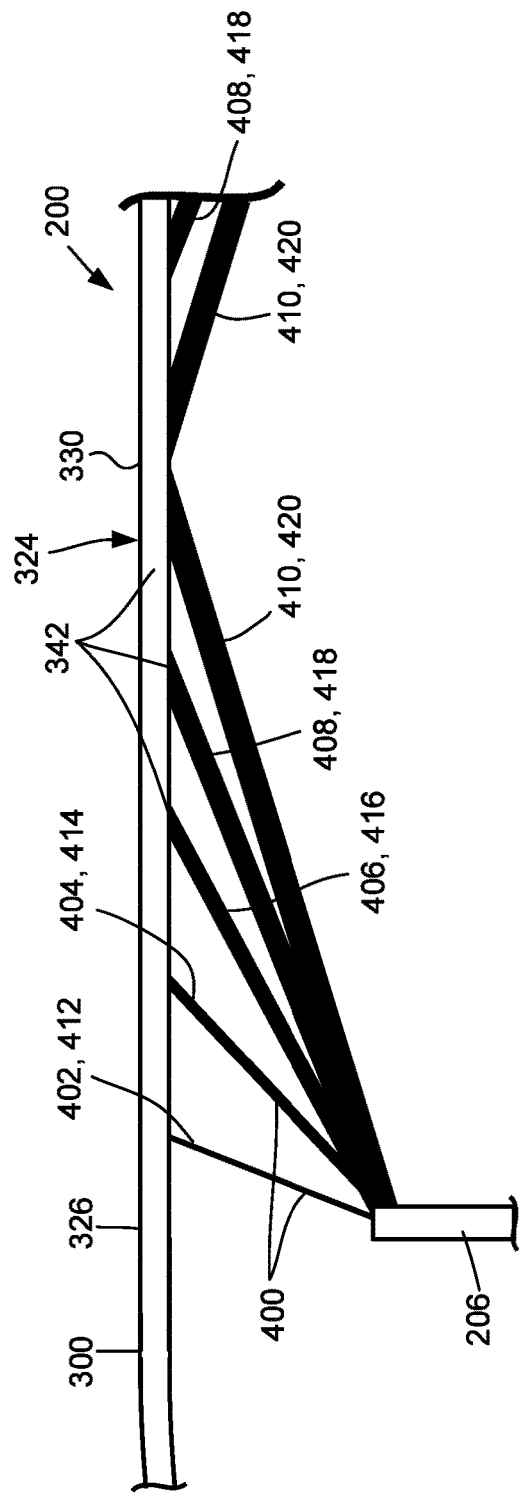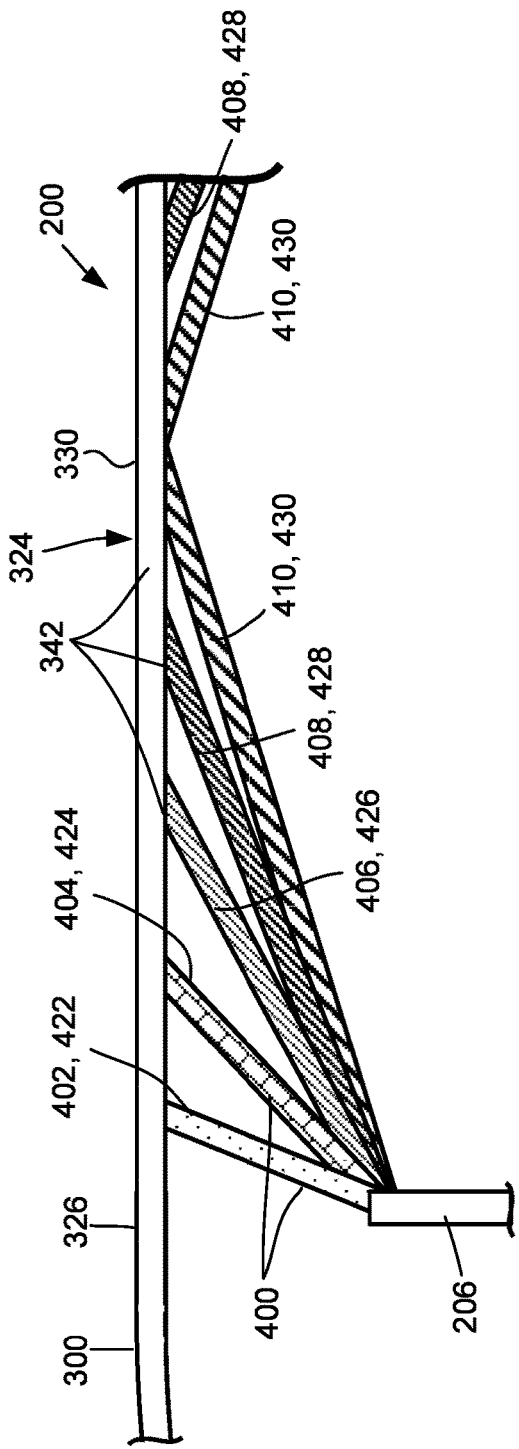

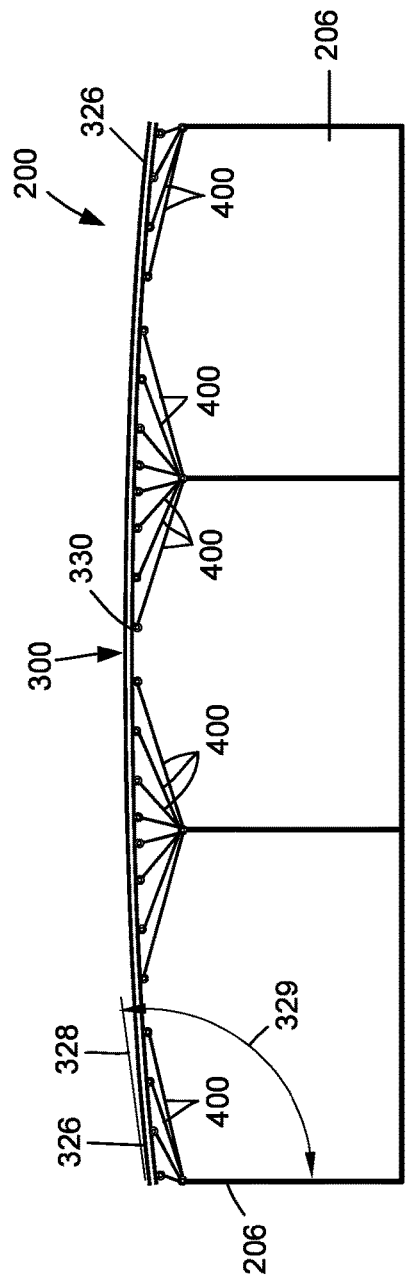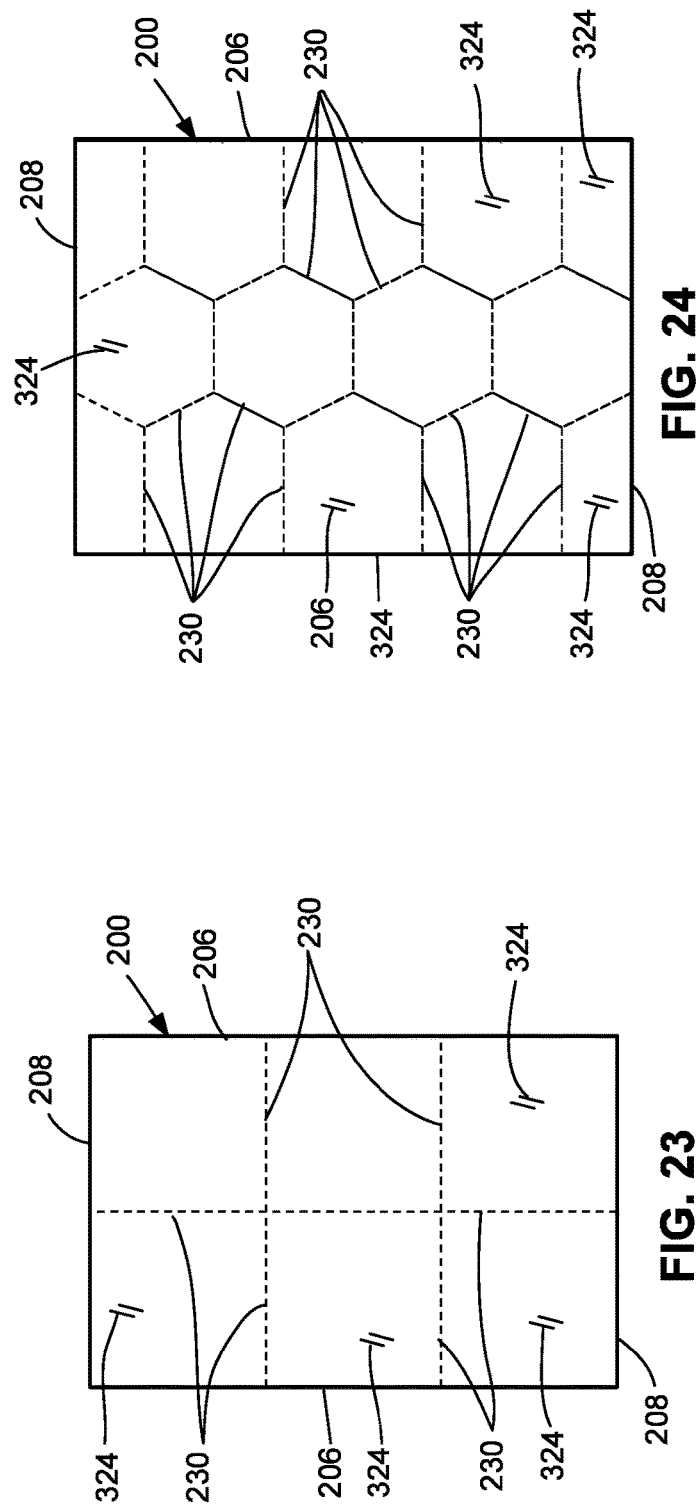

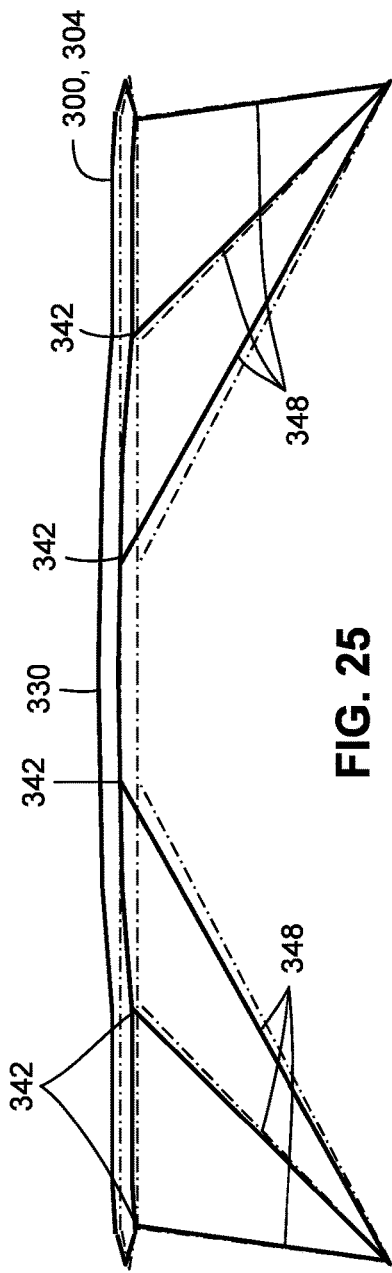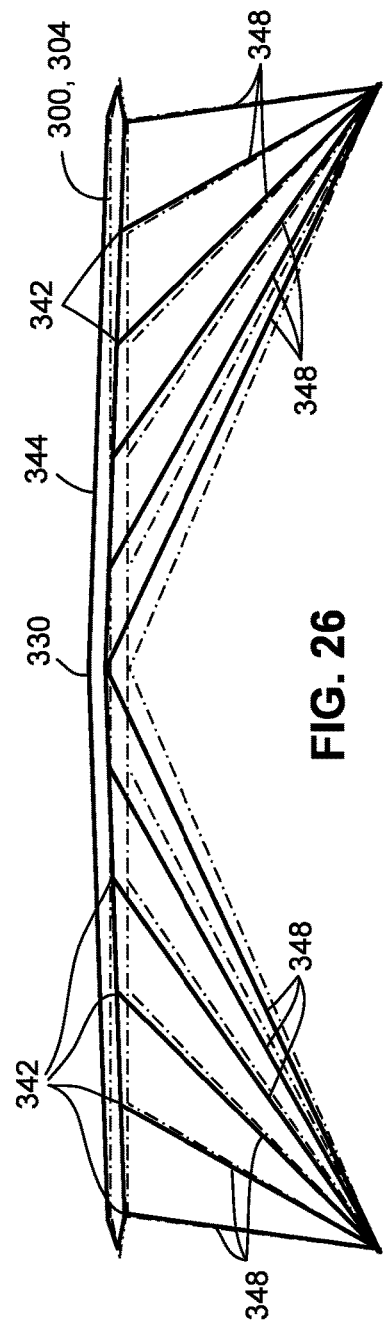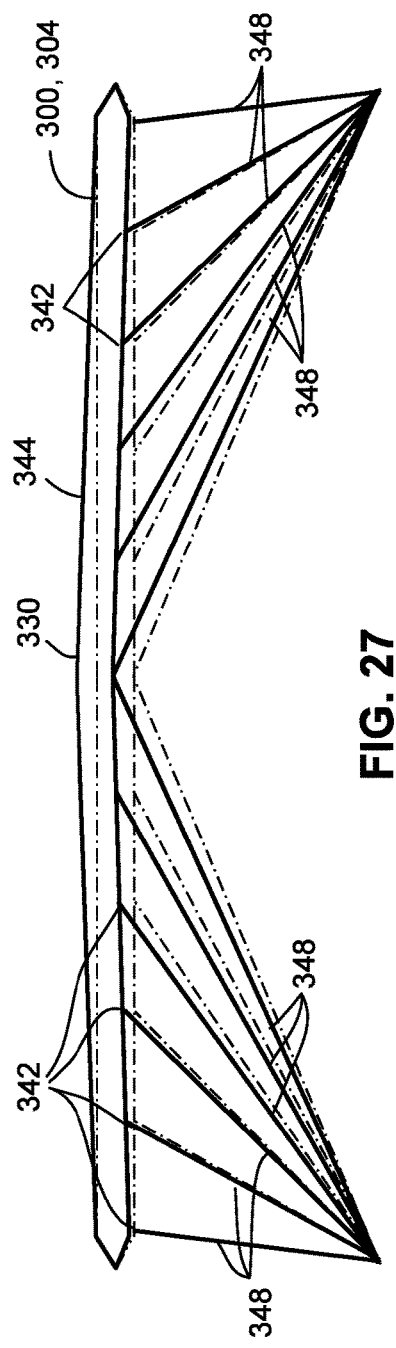

PRESSURE VESSEL HAVING SUBSTANTIALLY FLAT PANEL

FIELD

The present disclosure relates generally to pressure vessel configurations and, more particularly, to a pressure vessel having a substantially flat panel.

BACKGROUND

Pressure vessels typically have a rounded or circular cross-sectional shape due to the efficiency with which circular cross sections carry internal pressurization loads. For example, the internal pressurization of a spherical pressure vessel results in pure hoop tension stress and zero bending stress in the vessel wall. Internal pressurization of a cylindrical pressure vessel results primarily in hoop tension stress in the cylindrical portion of the pressure vessel. For passenger aircraft in which the cabin is pressurized to a certain fraction of standard atmosphere, the fuselage typically has a circular cross section, an elliptical cross section, or a cross section with multiple circular arcs due to the efficiency with which cylindrical pressure vessels carry internal pressurization loads. As a result of the structural efficiency of cylindrical pressure vessels, many pressurized aircraft are configured as tube-and-wing aircraft.

Blended-wing-body aircraft may have certain advantages over a tube-and-wing aircraft in terms of aerodynamics and cargo-carrying capabilities. For example, the tubular fuselage of a tube-and-wing aircraft generates aerodynamic drag which detracts from the fuel efficiency of the aircraft. In contrast, the centerbody of a blended-wing-body aircraft has an aerodynamically-shaped cross section that generates lift in addition to the lift generated by the wings. As a result, for certain aircraft sizes and range capabilities, blended-wing-body aircraft have a relatively high aerodynamic efficiency. Furthermore, the centerbody of a blended-wing-body aircraft has a generally flattened cross-sectional shape that provides a wide area for carrying passengers and/or cargo in comparison to the relatively narrow fuselage of a tube-and-wing aircraft.

However, the generally flattened cross-sectional shape of a blended-wing-body aircraft presents challenges with regard to pressurization. As mentioned above, the cabin of a passenger aircraft must typically be pressurized to a certain fraction of standard atmosphere. In addition, the structural assembly of the pressurized cabin must be designed to a predetermined safety factor. As a result, in one example, the cabin of a passenger aircraft may be designed for internal pressurization loads of 16-20 pounds per square inch (psi). When such an internal pressurization load is imposed on a generally flattened cross-sectional shape such as the centerbody of a blended-wing-body aircraft, out-of-plane pressure loads on a flat panel of the centerbody may deflect the panel outwardly at relatively high curvatures resulting in large bending moments and large bending stresses. The large bending stresses may dictate increased structural mass for load-carrying capability which adds to the overall weight of the blended-wing-body aircraft and reduces flight performance.

For panels that define the outer skin (e.g., the upper skin) of the centerbody, the high curvature induced in the panel by out-of-plane pressure loads may disrupt the aerodynamics of the centerbody and reduce the aerodynamic performance of the aircraft. In addition, flight loads (e.g., in-plane tension loads, compression loads, and/or shear loads) on the panel may couple with out-of-plane pressure loads, resulting in relatively high bending loads on the panel and requiring further increased structural mass for load-carrying capability and resulting in a decrease in payload-carrying capability, fuel efficiency, and/or range of the blended-wing-body aircraft.

As can be seen, there exists a need in the art for a pressure vessel at least partially enclosed by a substantially flat panel and which has a relatively high load-carrying efficiency and in which in-plane loads on the panel may be decoupled from out-of-plane pressure loads.

SUMMARY

The above-noted needs associated with pressure vessels are specifically addressed and alleviated by the present disclosure which provides a pressure vessel having at least one pair of side bulkheads spaced apart from each other and each having a bulkhead top portion. The pressure vessel includes at least one substantially flat panel having at least one panel span extending between the pair of side bulkheads and being in non-contacting proximity to the bulkhead top portions. The panel and the side bulkheads collectively form at least a portion of a structural assembly enclosing the pressure vessel. The pressure vessel includes a plurality of panel braces coupling the side bulkheads to the panel at a plurality of panel attachment nodes distributed along the panel span. At least two of the panel braces have a different axial stiffness configured to result in the outward deflection of the panel attachment nodes by substantially equal deflection amounts when the panel is subjected to an out-of-plane pressure load during internal pressurization of the pressure vessel.

Also disclosed is a method of loading a pressure vessel and which includes internally pressurizing the pressure vessel at least partially enclosed by a panel having at least one panel span extending between a pair of side bulkheads each having a bulkhead top portion in non-contacting proximity to the panel. The method of loading the pressure vessel further includes generating an out-of-plane pressure load on the panel in response to internally pressurizing the pressure vessel. In addition, the method includes transmitting the out-of-plane pressure load from the panel to the side bulkheads using a plurality of panel braces coupling the side bulkheads to the panel at a plurality of panel attachment nodes distributed along the panel. The method of loading also includes limiting, using the plurality of panel braces based on an axial stiffness that is different among at least two of the panel braces, outward deflection of the panel attachment nodes by substantially equal deflection amounts when internally pressurizing the pressure vessel.

In addition, disclosed is a method of manufacturing a pressure vessel. The method includes positioning a pair of side bulkheads in spaced relation to each other. The side bulkheads each have a bulkhead top portion. The method of manufacturing also includes positioning a substantially flat panel in non-contacting proximity to the bulkhead top portions such that at least one panel span extends between the pair of side bulkheads. The panel and the side bulkheads collectively form at least a portion of a structural assembly enclosing the pressure vessel. The method of manufacturing additionally includes coupling, using a plurality of panel braces, each of the side bulkheads to the panel at a plurality of panel attachment nodes distributed along the panel. As mentioned above, at least two of the panel braces have a different axial stiffness that results in or limits the outward deflection of the panel attachment nodes by substantially equal deflection amounts when the panel is subjected to an out-of-plane pressure load during internal pressurization of the pressure vessel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a top-down view of the blended-wing-body aircraft of FIG. 1 illustrating a pressurized passenger compartment and/or pressurized cargo hold representing an example of a pressure vessel as presently disclosed;

FIG. 3 is a sectional view of the blended-wing-body aircraft taken along line 3-3 of FIG. 2 and illustrating the pressurized passenger compartment and/or pressurized cargo hold (e.g., the pressure vessel) bounded by a pair of side bulkheads and a substantially flat panel extending between the pair of side bulkheads;

FIG. 11 is a sectional view of an example of a portion of a blended-wing-body aircraft showing an example of a rigid connection;

FIG. 12 is a magnified view of a portion of the blended-wing-body aircraft identified by reference numeral 12 of FIG. 11 and showing a rigid connection between each panel brace and the panel and a pinned connection at the vessel rib;

FIG. 13 is a magnified view of a portion of the blended-wing-body aircraft identified by reference numeral 13 of FIG. 11 and showing a rigid connection between each panel brace and the panel and a pinned connection at the side bulkhead;

FIG. 14 illustrates an example of a pressure containment mechanism between the panel and the side bulkhead and in which the pressure containment mechanism is configured as a block of elastomeric material;

FIG. 15 illustrates an example of a pressure containment mechanism configured as a plate-seal assembly having a seal member configured as a seal strip;

FIG. 16 illustrates a further example of the seal member configured as an O-ring seal;

FIG. 17 shows a portion of an example of pressure vessel in which the panel attachment nodes are uniformly spaced and further illustrating panel braces having an axial stiffness that gradually increases along a direction from the side braces to the midspan of the panel and showing the panel braces formed of a common material but having different cross-sectional areas;

FIG. 18 shows a portion of an example of a pressure vessel in which the panel attachment nodes are uniformly spaced and further illustrating panel braces having an axial stiffness that gradually increases along a direction from the side braces to the midspan of the panel and showing the panel braces having the same cross-sectional area but formed of different materials;

FIG. 22 is a cross-sectional view of an example of a pressure vessel having a panel that is slightly curved;

FIG. 23 is a top-down view of an example of a pressure vessel having vessel ribs arranged in an orthogonal pattern;

FIG. 24 is a top-down view of an example of a pressure vessel having vessel ribs oriented non-parallel to each other and/or non-parallel to the side bulkheads;

FIG. 25 is a cross-sectional view of a 2-inch thick panel supported by 6 strength braces that are sized for axial strength;

FIG. 26 is a cross-sectional view of the 2-inch thick panel supported by 12 strength braces sized for axial strength;

FIG. 27 is a cross-sectional view of a 4-inch thick panel supported by 12 strength braces sized for axial strength;

DETAILED DESCRIPTION

Figure 1:
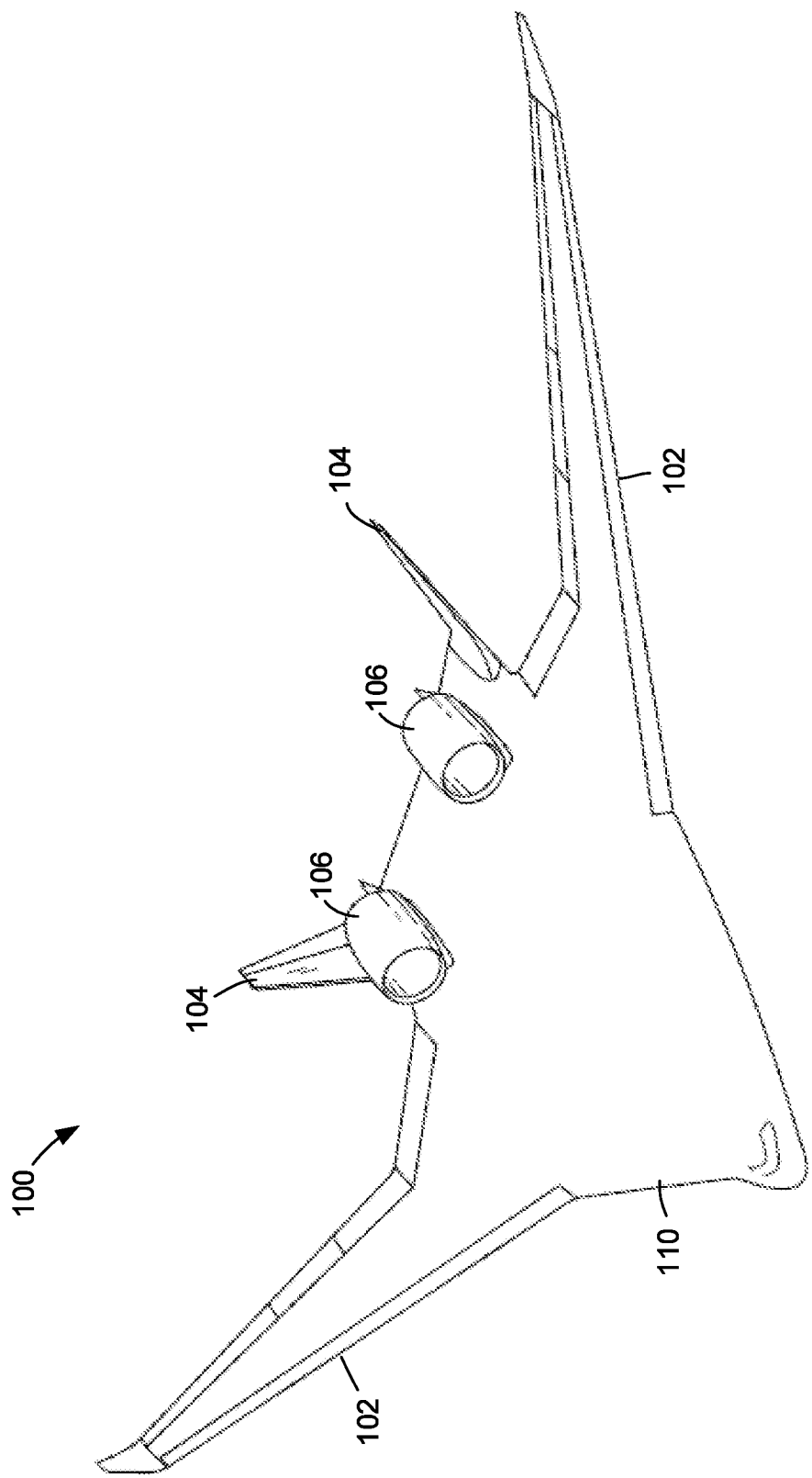
FIG. 1 is a perspective view of an example of a blended-wing-body aircraft.

Referring now to the drawings which illustrate preferred and various examples of the disclosure, shown in FIG. 1 is a perspective view of an example of a blended-wing-body aircraft 100. The aircraft includes a centerbody 110 and a pair of wings 102 extending outwardly from the centerbody 110. The aircraft 100 may further include a pair of vertical stabilizers 104 located on an aft portion of the centerbody 110. The aircraft additionally includes propulsion units 106 which, in the example shown, are mounted on pylons protruding upwardly from an aft end of the aircraft 100.

FIG. 2 is a top-down view of the blended-wing-body aircraft 100 showing a payload bay 108 in the centerbody 110. In one example, the payload bay 108 may be configured as a passenger cabin 112 and/or as a cargo hold 114 and may be internally pressurized such that the payload bay 108 represents an example of a pressure vessel 200 as presently disclosed. Advantageously, the relatively wide shape of the centerbody 110 allows the payload bay 108 to carry a large number of passengers and/or carry cargo having a relatively large width. However, the payload bay 108 may be configured for use in any one of a variety of applications.

Although the presently-disclosed pressure vessel 200 is described in the context of a passenger cabin 112 and/or cargo hold 114 of a blended-wing-body aircraft 100, the pressure vessel 200 may be implemented for use in any one of a variety of applications. For example, the pressure vessel 200 may be implemented for use in marine vessels, land-based structures and vehicles, airborne applications (e.g., any type of aircraft), and in space applications. In addition, the pressure vessel 200 may be configured for containing any one of a variety of fluids including liquids and/or gases, and is not limited to internal pressurization 470 via air pumped into a passenger cabin 112 or cargo hold 114 of an aircraft.

Figure 4:
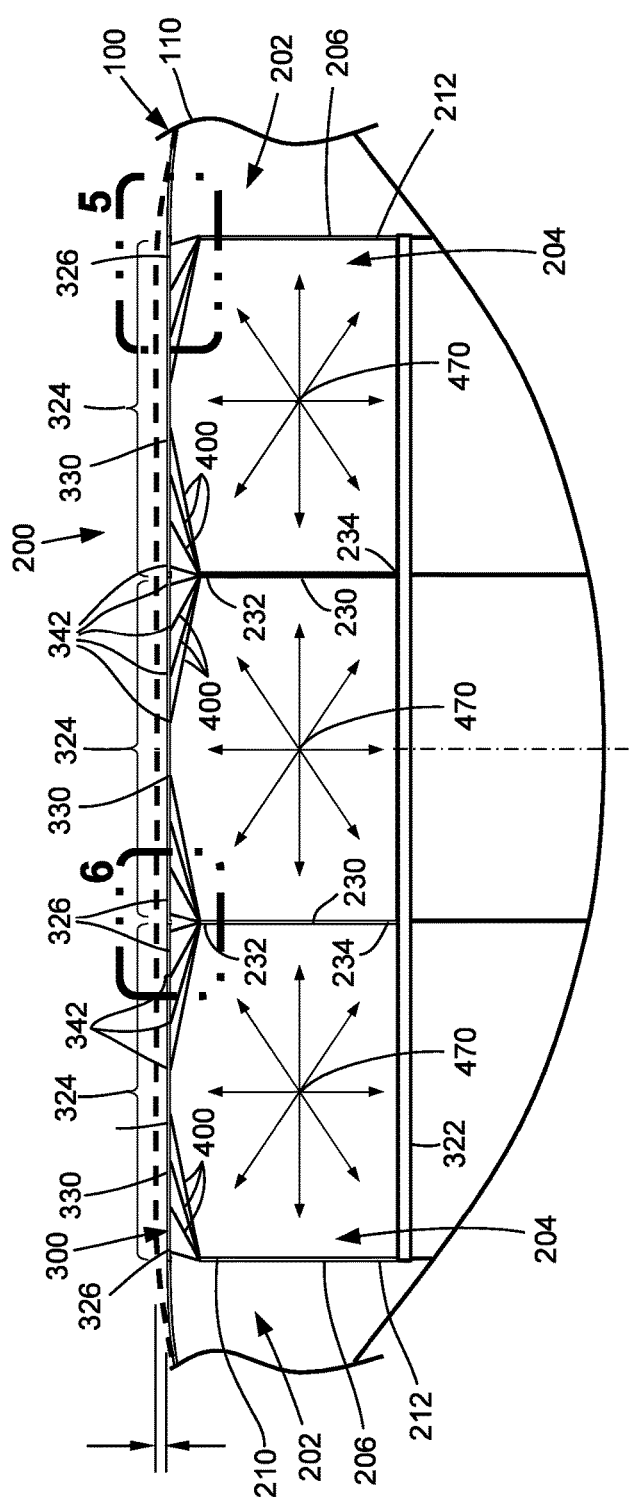
FIG. 4 is a magnified view of the portion of the blended-wing-body aircraft identified by reference numeral 4 of FIG. 3 and illustrating a plurality of panel braces coupling the panel to the side bulkheads and vessel ribs.

Referring to FIGS. 2-3, the pressure vessel 200 includes at least one pair of side bulkheads 206 spaced apart from each other. Each side bulkhead 206 has a bulkhead top portion 210 (FIGS. 4-5) and a bulkhead bottom portion 212 (FIG. 4). In addition, the pressure vessel 200 includes at least one substantially flat panel 300 having at least one panel span 324 extending between the side bulkheads 206. In an alternative example described below and shown in FIG. 18, the panel 300 may be slightly curved. As shown in FIG. 3, the panel 300 may be a top panel 320 or an upper skin panel of the centerbody 110 and may define an aerodynamic surface 116 of the aircraft. In this regard, the panel 300 may be configured to sustain flight loads in addition to out-of-plane pressure loads on the panel 300 caused by internal pressurization 470 (FIG. 4) of the payload bay 108. Such flight loads on the panel 300 may include in-plane loads such as compression loads, tension loads, and/or shear loads acting on the panel 300 due to bending of the wings 102, aerodynamic forces on the centerbody 110, and/or other flight loads.

The top panel 320 is located in non-contacting proximity to the bulkhead top portion 210 of each side bulkhead 206 and which results in a panel-bulkhead gap 214 between the panel 300 and each bulkhead top portion 210. The top panel 320 and the side bulkheads 206 collectively form at least a portion of a structural assembly 198 enclosing the pressure vessel 200. For example, as shown in FIG. 3, the structural assembly 198 may include at least one pair of side bulkheads 206, the top panel 320, and a bottom panel 322 which may extend between the side bulkheads 206.

In FIGS. 2-3, the pressure vessel 200 may include one or more vessel ribs 230 located between the side bulkheads 206. Each vessel rib 230 has a rib top portion 232 and a rib bottom portion 234. The panel 300 is in non-contacting proximity to the rib top portion 232 of each vessel rib 230 and which results in a panel-rib gap 236 (FIG. 3) between the panel 300 and each vessel rib 230. The vessel ribs 230 may divide the top panel 320 into two or more panel spans 324 each having a shorter width than the width of a single panel span (not shown) extending between the side bulkheads 206. The vessel ribs 230 may also divide the bottom panel 322 into two or more panel spans 324. The vessel ribs 230 may improve the structural efficiency of the pressure vessel 200, as described below.

Figure 5:
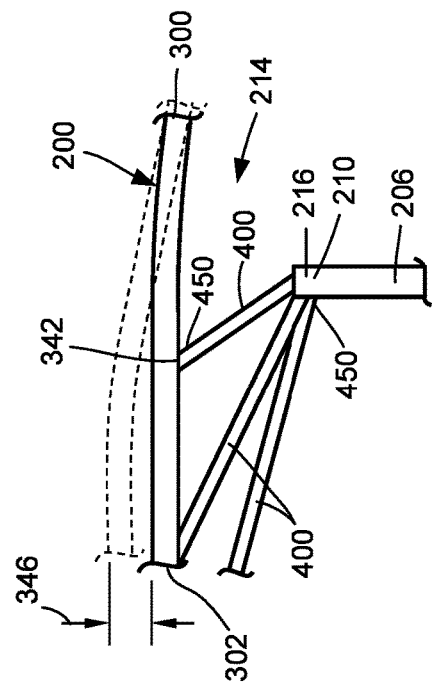
FIG. 5 is a magnified view of a portion of the blended-wing-body aircraft identified by reference numeral 5 of FIG. 4 and illustrating an example of a plurality of panel braces coupling a panel to a side bulkhead.
Figure 6:
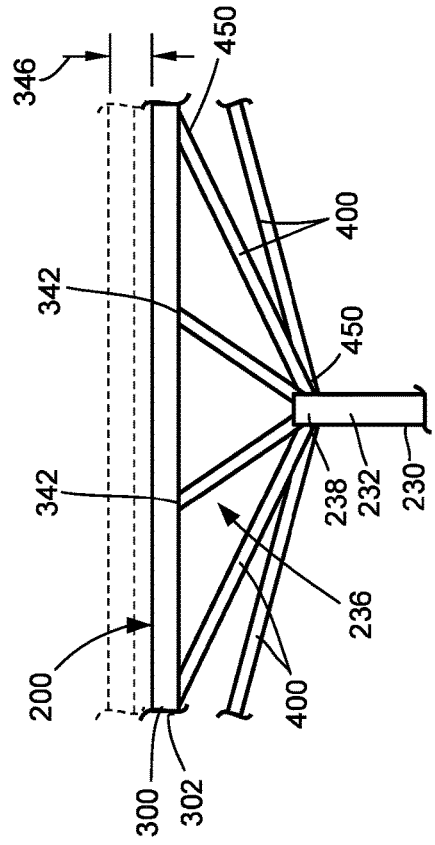
FIG. 6 is a magnified view of a portion of the blended-wing-body aircraft identified by reference numeral 6 of FIG. 4 and illustrating an example of a plurality of panel braces coupling the panel to a vessel rib.

Referring to FIGS. 4-6, shown in FIG. 4 is a magnified view of the centerbody 110 of FIGS. 1-3 and illustrating a plurality of panel braces 400 coupling the side bulkheads 206 and vessel ribs 230 to the top panel 320 at a plurality of panel attachment nodes 342 distributed along the panel spans 324. Significantly, the use of the panel braces 400 for attaching the side bulkheads 206 and vessel ribs 230 to the top panel 320 greatly reduces the relatively large bending moment that the top panel 320 would otherwise be subjected to if the top panel 320 were attached directly to the side bulkheads 206 and/or vessel ribs 230. Additionally, the panel braces 400 may decouple out-of-plane pressure loads (e.g., due to internal pressurization 470 of the pressure vessel 200) and in-plane loads (e.g., due to flight loads) which may improve the structural efficiency of the pressure vessel 200, as described below. As shown in FIG. 4, each panel brace 400 has opposing brace ends 450. One of the brace ends 450 of each panel brace 400 is attached to a panel attachment node 342, and the remaining brace end 450 of each panel brace 400 is attached to a side bulkhead 206 at a bulkhead attachment node 216, or to a vessel rib 230 at a rib attachment node 238. In FIG. 5, the brace ends 450 of the panel braces 400 are attached to a common brace-bulkhead attachment location 218 on the bulkhead top portion 210 which may simplify manufacturing. However, in an example not shown, the brace ends 450 of two or more of the panel braces 400 may be attached to different attachment locations which may be vertically spaced along the side bulkhead 206.

In FIG. 4, the bottom panel 322 may be directly coupled to the side bulkheads 206. For example, the bulkhead bottom portion 212 of one or more of the side bulkheads 206 may be directly coupled to the bottom panel 322 causing bending loads in each side bulkhead 206 (e.g., due to internal pressurization 470 of the pressure vessel 200) to be transmitted to the bottom panel 322. Similarly, the rib bottom portion 234 of one or more of the vessel ribs 230 may be directly coupled to the bottom panel 322. However, in an example not shown, the bottom panel 322 may be coupled to the side bulkheads 206 and/or the vessel ribs 230 using a plurality of panel braces 400 configured and arranged in a manner similar to the plurality of panel braces 400 coupling the top panel 320 to the side bulkheads 206, and which may reduce or prevent bending loads in the side bulkhead 206 and bottom panel 322 (e.g., due to internal pressurization 470) from being transmitted between each other. The top panel 320 (i.e., unsupported by the panel braces 400) may have a substantially uniform bending stiffness. For example, the bending stiffness at all locations of the top panel 320 may be within 20 percent of each other. However, in other examples, the bending stiffness may differ by more than 20 percent at different locations on the top panel 320.

As shown in FIGS. 4-6 and described in greater detail below, in the presently-disclosed pressure vessel 200, at least two of the panel braces 400 coupling a panel 300 (e.g., the top panel) to the side bulkheads 206 have a different axial stiffness configured to result in the outward deflection of the panel attachment nodes 342 by substantially equal deflection amounts 346 when the panel 300 is subjected to an out-of-plane pressure load during internal pressurization 470 of the pressure vessel 200. As described below, differences in axial stiffness among two or more of the panel braces 400 may be achieved by varying the cross-sectional areas of the two or more panel braces 400. Alternatively or additionally, differences in axial stiffness among two or more of the panel braces 400 may be achieved by varying the modulus of elasticity (e.g., the elastic modulus or Young's modulus), as described in greater detail below.

Advantageously, substantially equal outward deflection of the panel attachment nodes 342 may preserve or maintain the contour of the panel 300 (e.g., the planar shape of the top panel 320 in FIG. 4; the slightly curved shape of the top panel 320 in FIG. 18) when subjected to the out-of-plane pressure load relative to the contour of the panel 300 when the pressure vessel 200 is non-pressurized. Preserving or maintaining the contour of a panel 300 during internal pressurization 470 of the pressure vessel 200 may be advantageous for implementations in which the panel 300 (e.g., the top panel 320) serves as an aerodynamic surface 116 (FIGS. 2-3) such as in the blended-wing-body aircraft 100 shown in FIGS. 1-3 as described in greater detail below. As mentioned above, the panel braces 400 may decouple out-of-plane pressure loads and in-plane loads, which may improve the structural efficiency of the pressure vessel 200. The decoupling of out-of-plane pressure loads and in-plane loads greatly reduces the relatively large bending moment that the panel 300 would otherwise need to carry if the panel 300 was directly attached to the side bulkheads 206 and/or to the vessel ribs 230.

As mentioned above, the pressure vessel 200 includes the side bulkheads 206 arranged in spaced relation to each other. FIG. 2 shows the side bulkheads 206 extending along a longitudinal direction 120 of the payload bay 108. Each one of the side bulkheads 206 may be generally straight and planar as shown in FIGS. 2-4. However, the side bulkheads 206 may each have a non-straight and/or non-planar shape (not shown). Although shown as being vertically oriented and parallel to each other, the side bulkheads 206 may be non-vertically oriented and/or may be non-parallel to each other. The pressure vessel 200 may include one or more additional bulkheads for enclosing the pressure vessel 200. For example, FIG. 2 shows an end bulkhead 208 located on at least one of opposing ends of the payload bay 108 and extending along the lateral direction 118 for closing off the end of the pressure vessel 200. The end bulkhead 208 on at least one end of the pressure vessel 200 may be directly coupled to the side bulkheads 206 and bottom panel 322. Additionally, in any example of a pressure vessel 200, the end bulkhead 208 may be coupled to the top panel 320 via a plurality of panel braces 400 in an arrangement similar to the panel braces 400 coupling the top panel 320 to the side bulkheads 206.

As mentioned above, the pressure vessel 200 may include at least one vessel rib 230 located between the pair of side bulkheads 206 shown in FIG. 4. For example, the pressure vessel 200 shown in FIGS. 2-4 has two (2) vessel ribs 230 which are positioned equidistantly between each other and the side bulkheads 206. However, a pressure vessel 200 may include any number of vessel ribs 230 and which may be positioned equidistantly or non-equidistantly between each other and the side bulkheads 206. Each one of the vessel ribs 230 may be generally straight and planar as shown in the figures although non-straight and/or non-planar shapes are contemplated for the vessel ribs 230. Each vessel rib 230 may be oriented in parallel relation to the side bulkheads 206 as shown in FIG. 2. However, in other examples (FIG. 24) described below, a pressure vessel 200 may include one or more vessel ribs 230 oriented in non-parallel relation to one or more of the side bulkheads 206.

Referring to FIG. 4, as mentioned above, the pressure vessel 200 includes at least one substantially flat panel 300 (e.g., a top panel) having at least one panel span 324 extending along the lateral direction 118 (FIG. 2) between the side bulkheads 206. The panel 300 of a pressure vessel 200 (not shown) lacking vessel ribs 230 may include a single panel span 324 extending along the lateral direction 118 between the side bulkheads 206. For a pressure vessel 200 (not shown) having a single vessel rib 230, the panel 300 may be divided into two panel spans 324 each extending between a side bulkhead 206 and the vessel rib 230. For the pressure vessel 200 shown in FIGS. 2-4 having two (2) vessel ribs 230, the panel 300 may be divided into three (3) panel spans 324, two (2) of which extend between a side bulkhead 206 and one of the vessel ribs 230, and the remaining panel span 324 extending between the two (2) vessel ribs 230. Each panel span 324 has opposing panel side portions 326 and a panel center portion 330 located between the panel side portions 326.

As shown in FIGS. 4 and 6, each vessel rib 230 may be coupled to the panel 300 using a plurality of panel braces 400. The plurality of panel braces 400 may extend from the rib top portion 232 of each vessel rib 230 to a corresponding plurality of panel attachment nodes 342 distributed along the panel spans 324 on opposite sides of the vessel rib 230. FIG. 6 shows the brace ends 450 of panel braces 400 attached to a common brace-rib attachment location 240 on the rib top portion 232. However, in other examples not shown, the brace ends 450 of two or more of the panel braces 400 may be attached to different attachment locations vertically spaced along the vessel rib 230.

As mentioned above, for the plurality of panel braces 400 coupling the panel 300 to the side bulkheads 206 and for the plurality of panel braces 400 coupling the panel 300 to one or more vessel ribs 230 and/or to one or more end bulkheads 208, at least two of the panel braces 400 have a unique axial stiffness that results in the outward deflection of the panel attachment nodes 342 by substantially equal deflection amounts 346 when the panel 300 is subjected to uniform out-of-plane pressure during internal pressurization 470 of the pressure vessel 200. For example, the panel braces 400 coupling the side bulkhead 206 to the top panel 320 in FIG. 5 may have a unique axial stiffness that results in outward deflection of the panel attachment nodes 342 by the same deflection amount 346 as the deflection amount 346 of the panel attachment nodes 342 coupled by the panel braces 400 to the vessel rib 230 in FIG. 6. In one example, the outward deflection of any panel attachment node 342 along the panel 300 during internal pressurization 470 of the pressure vessel 200 may be within 20 percent and, more preferably, within 10 percent of the outward deflection of any other panel attachment node 342 of the panel 300. Advantageously, the panel attachment nodes 342 divide the panel 300 into a plurality of panel segments 332 as mentioned above. Each panel brace 400 has an axial stiffness configured to enforce or limit the outward deflection of a panel attachment node 342. Limiting, via the panel braces 400, the outward deflection of the panel attachment nodes 342 reduces the magnitude of the allowable buckling load on the panel 300 relative to the bucking load that would otherwise occur without the panel braces 400. The buckling load may be described as the compression load at which the panel 300 will buckle.

The technical effect of including vessel ribs 230 may be an improvement in the structural efficiency of the pressure vessel 200. For example, as mentioned above, including vessel ribs 230 in a pressure vessel 200 divides the panel 300 into two or more panel spans 324 each having a width that is shorter than the width of a single panel span 324 that would extend between the side bulkheads 206 of a pressure vessel 200 lacking vessel ribs 230. A reduction in the width of the panel span 324 allows for a reduction in the length and therefore the weight of the panel braces 400 that would otherwise be required to extend from each side bulkhead 206 to the panel center portion 330 of a single panel span 324 extending between the side bulkheads 206.

Referring again to FIG. 4, on each side of the pressure vessel 200 (e.g., proximate the side bulkheads 206), the panel side portion 326 may overlap the side bulkhead 206 and extend toward an exterior side 202 of the pressure vessel 200. For example, the top panel 320 may overlap the side bulkhead 206 on each side of the pressure vessel 200 and may define at least a portion of the upper skin panel (not shown) of one of the wings 102. Alternatively, in an example not shown, the panel side portion 326 on each side of the pressure vessel 200 may terminate at a location directly above the side bulkhead 206. In a still further example not shown, each panel side portion 326 may terminate at a location on an interior side 204 of a side bulkhead 206.

Figure 7:
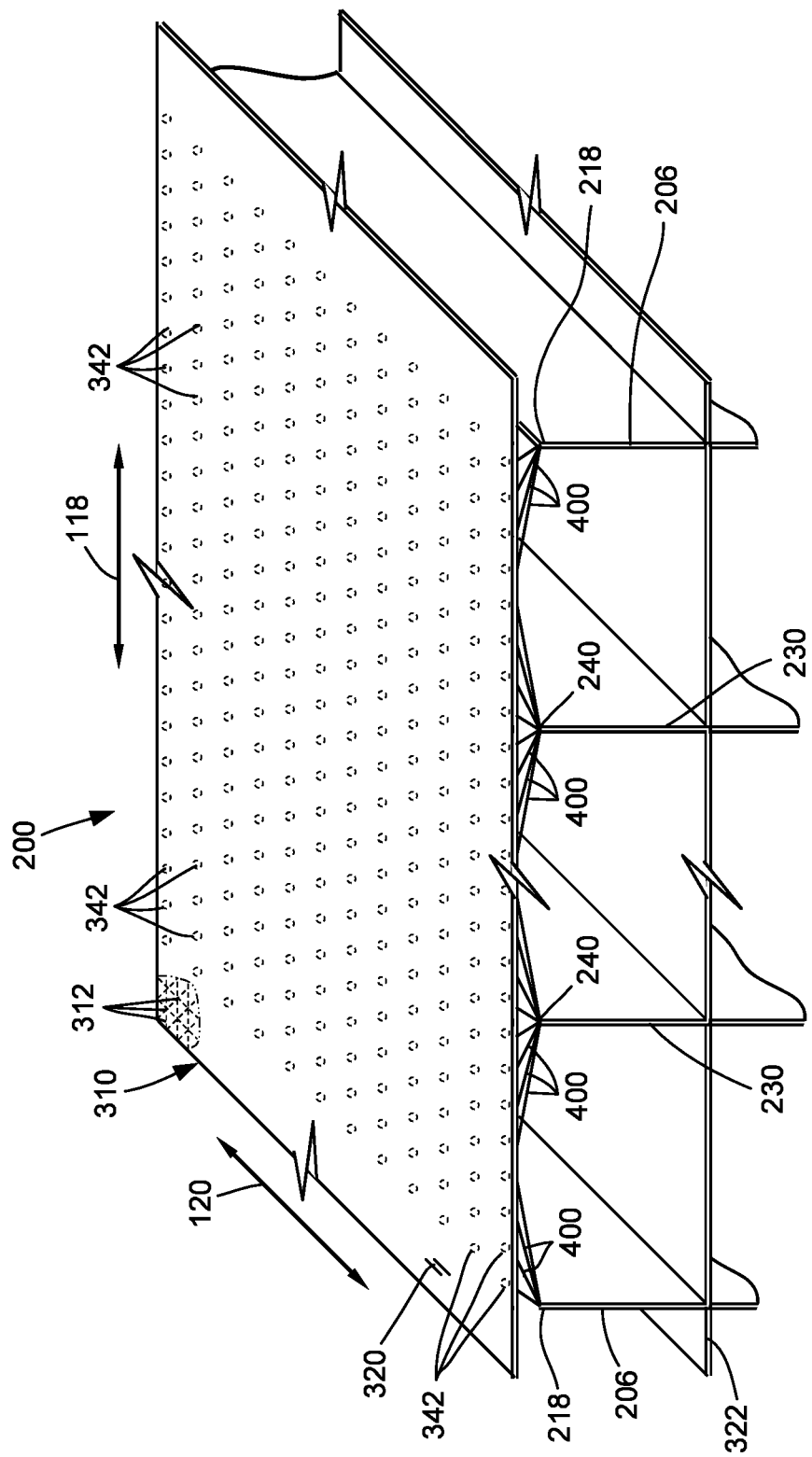
FIG. 7 is a perspective view of an example of a pressure vessel having a panel coupled to side bulkheads and vessel ribs by a plurality of panel braces.

FIG. 7 is a perspective view of an example of a pressure vessel 200 having a pair of side bulkheads 206 and a pair of vessel ribs 230 each extending along the longitudinal direction 120 and each being coupled to the top panel 320 by a plurality of panel braces 400. In the example shown, the panel attachment nodes 342 may be uniformly spaced along the lateral direction 118 of the pressure vessel 200 and/or along the longitudinal direction of the pressure vessel 200. However, in other examples, the panel attachment nodes 342 may be non-uniformly spaced along the lateral direction 118 and/or the longitudinal direction 120 of the top panel 320. Regardless of the spacing, the panel attachment nodes 342 may define a two-dimensional pattern along the top panel 320. The panel braces 400 may be attached to each side bulkhead 206 at a plurality of brace-bulkhead attachment locations 218 (FIG. 4) arranged at spaced intervals along each side bulkhead 206.

The panel braces 400 may be attached to each vessel rib 230 at a plurality of brace-rib attachment locations 240 (FIG. 4) arranged at spaced intervals along each vessel rib 230. For example, the arrangement of panel braces 400 shown in FIG. 7 may be repeated at spaced intervals along the longitudinal direction 120 of the pressure vessel 200. As mentioned above, two or more of the panel braces 400 coupling the panel 300 to the side bulkheads 206 and vessel ribs 230 in FIG. 7 may have a unique axial stiffness configured to result in the outward deflection of the two-dimensional pattern of panel attachment nodes 342 by substantially equal deflection amounts 346 (e.g., FIGS. 5-6) when the panel 300 is subjected to an out-of-plane pressure load during internal pressurization 470 (FIG. 4) of the pressure vessel 200.

As a result of the panel attachment nodes 342 deflecting outwardly by substantially equal amounts, the panel 300 is subjected to reduced bending stress when under out-of-plane pressure load relative to the bending stress that would otherwise occur during internal pressurization 470 of a pressure vessel 200 lacking panel braces 400 and in which the panel 300 is directly coupled to the side bulkheads 206 and vessel ribs 230 (if included). As a result of the reduced bending stress in the panel 300, the in-plane loads and the out-of-plane pressure load on the panel 300 are effectively decoupled. In the context of an aircraft such as a blended-wing-body aircraft 100 (FIGS. 1-3), the flight loads (e.g., in-plane tension loads, in-plane compression loads, and/or in-plane shear loads) on the panel 300 of the centerbody 110 may be decoupled from the out-of-plane pressure load on the panel 300. The decoupling of the out-of-plane pressure load and in-plane loads allows the panel 300 to be lighter in weight due to reduced bending loads on the panel 300. The reduced weight of the panel 300 may result in improved operating performance such as increased range, fuel efficiency, climb rate, payload capability, and other performance improvements. In addition, the panel braces 400 may reduce or prevent changes in the aerodynamic shape or contour of the panel 300 that would otherwise occur without the panel braces 400. In this regard, the panel braces 400 may result in outward deflection of the panel 300 by a uniform amount across the length and/or width of the panel 300 and may thereby maintain the aerodynamic shape of the centerbody 110 during internal pressurization 470 which may preserve the aerodynamic performance of the blended-wing-body aircraft 100.

Figure 10:
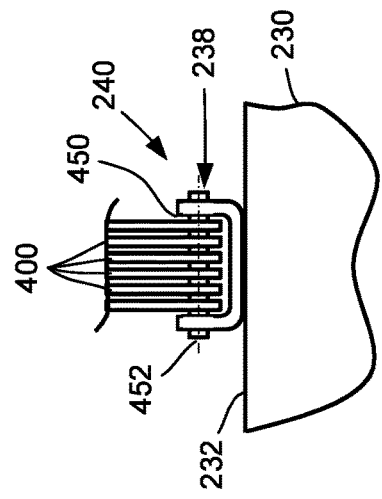
FIG. 10 is a sectional view taken along line 10-10 of FIG. 9 and further illustrating an example of a pinned connection.
Figure 9:
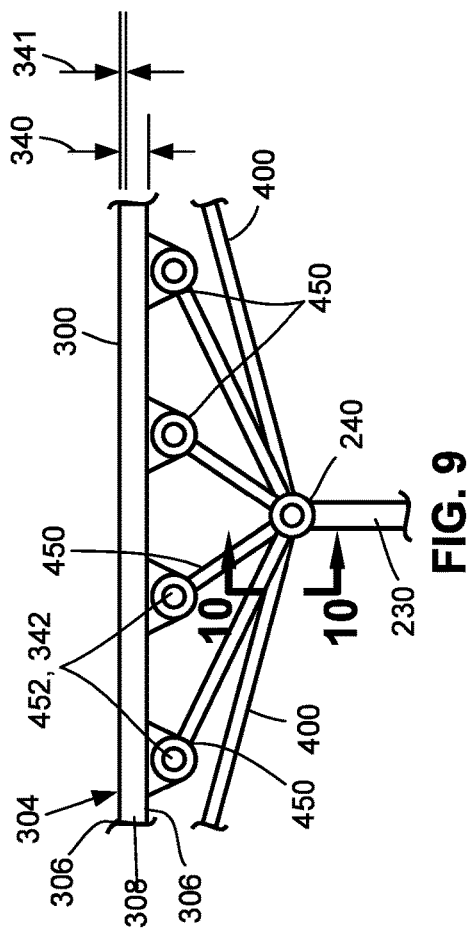
FIG. 9 is a magnified view of a portion of the blended-wing-body aircraft identified by reference numeral 9 of FIG. 8 and illustrating an example of the pinned connection.
Figure 8:
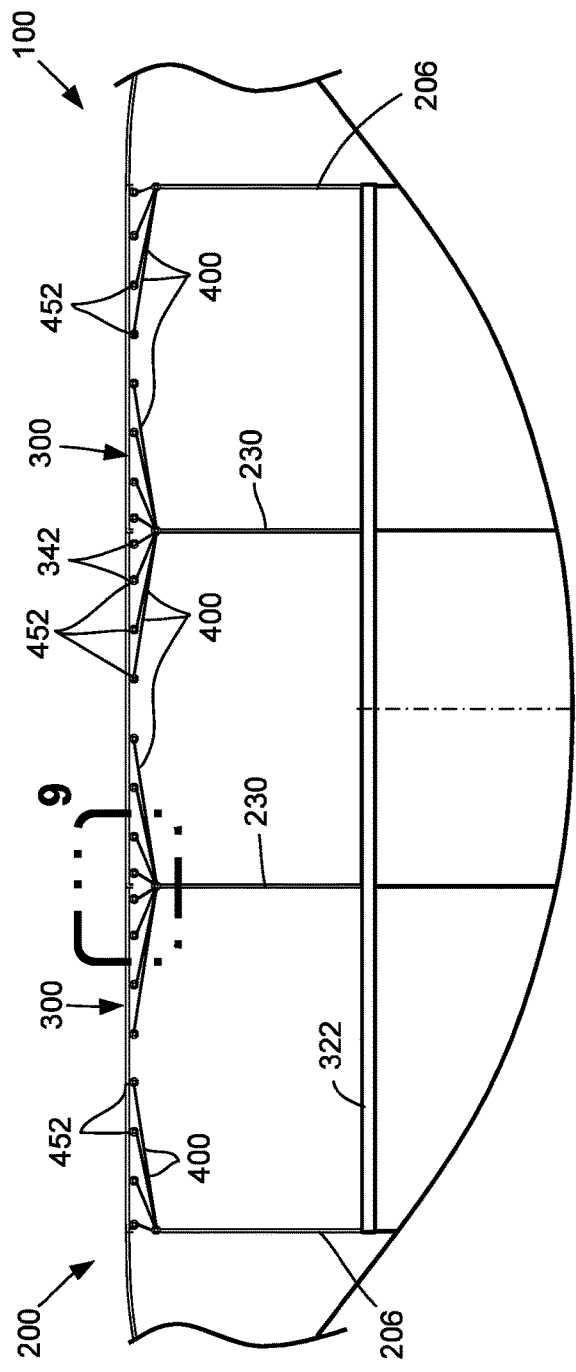
FIG. 8 is a sectional view of an example of a portion of a blended-wing-body aircraft showing an example of a pinned connection at the panel brace end of each panel brace.

Referring to FIGS. 8-10, shown in FIG. 8 is an example of a portion of a blended-wing-body aircraft 100 illustrating an example of a pinned connection 452 coupling each one of the panel braces 400 to the panel 300 and to the side bulkheads 206 and vessel ribs 230. FIG. 9 is a magnified view of an example of a pinned connection 452 coupling the brace end 450 of each panel brace 400 to the panel attachment node 342. The remaining brace end 450 of each panel brace 400 is coupled to a common brace-rib attachment location 240. For example, FIG. 10 shows an example of a pinned connection 452 coupling the brace end 450 of each panel brace 400 to a rib attachment node 238 at the rib top portion 232 of the vessel rib 230. The pinned connection 452 at each panel attachment node 342 allows for rotation of the panel 300 relative to the panel brace 400. Similarly, the pinned connection 452 at the rib attachment node 238 allows for rotation of the panel brace 400 relative to the vessel rib 230. In the example of FIGS. 9-10, the pinned connection 452 may comprise a bracket attached to the rib top portion 232. The bracket may include a common pin extending through the brace ends 450 of the panel braces 400. Although not shown in FIG. 10, one or more of the panel braces 400 may include a joggle at some point along the length of the panel brace 400 to allow the panel attachment nodes 342 to be aligned with each other in the lateral direction 118 as shown in FIG. 7. The pinned connections 452 shown in FIG. 9 represent the general concept of a joint that allows rotation of the panel brace 400 relative to the panel attachment nodes 342 and/or that allows rotation of the panel brace 400 relative to a vessel rib 230 (or a side bulkhead 206—FIG. 8), and are not intended to limit alternative structural configurations of pinned connections 452 that may be included with a pressure vessel 200. In this regard, the pressure vessel 200 may include one or more pinned connections 452 having any one of a variety of alternative structural configurations, such as a different edge distance for a pin (not shown) extending through the pinned connection, and/or the brace ends 450 of each of the panel braces 400 may have any one of a variety of different structural configuration.

Referring to FIGS. 11-13, shown in FIG. 11 is an example of a portion of a blended-wing-body aircraft 100 illustrating an example of a rigid connection 454 coupling the panel braces 400 to the panel 300. Also shown are pinned connections 452 coupling the panel braces 400 to the side bulkheads 206 and to the vessel ribs 230. FIG. 12 shows an example of a rigid connection 454 at each panel attachment node 342 for coupling the panel 300 to the brace end 450 of each panel brace 400. Also shown is a pinned connection 452 coupling the brace end 450 of each panel brace 400 to a common brace-rib attachment location 240 on the rib top portion 232 of the vessel rib 230. FIG. 13 shows an example of a rigid connection 454 at each panel attachment node 342 for coupling the panel 300 to the panel braces 400, and also shows a pinned connection 452 coupling the brace end 450 of each panel brace 400 to a common brace-bulkhead attachment location 218 on the bulkhead top portion 210 of the side bulkhead 206. Rigid connection 454 at the panel attachment nodes 342 may tend to prevent rotation of the panel 300 relative to the panel braces 400 by providing moment restraint to the panel 300 at the rigid connection 454. In one example, the rigid connection 454 may include mechanical fastening and/or adhesive bonding of the brace end 450 to the panel 300. For example, the panel 300 may be configured as a monocoque panel 314 having a skin member 316 coupled to a plurality of stringers 318 which may be spaced apart from each other. The brace end 450 of the panel brace 400 may be mechanically fastened to the stringers 318.

FIG. 13 also shows an example of a pinned connection 452 coupling the brace end 450 of each panel brace 400 to a common brace-bulkhead attachment location 218 on the bulkhead top portion 210 of the side bulkhead 206. The selection of either a pinned connection 452 or a rigid connection 454 for attaching a panel brace 400 to the panel 300 and/or to the side bulkheads 206 or vessel ribs 230 may be dependent, at least in part, upon the magnitude and/or type of load at the connection during outward deflection of the panel 300. For example, a pinned connection 452 may be selected for attaching a panel brace 400 to a panel attachment node 342 if it is determined that a rigid connection 454 would result in an excessively high bending moment on the panel 300 or on the panel brace 400 during outward deflection of the panel 300. Alternatively, a rigid connection 454 may be selected for attaching the panel brace 400 to a panel attachment node 342 or to a side bulkhead 206 or vessel rib 230 if a relatively high axial load must be transferred between the panel brace 400 and the panel 300 or side bulkhead 206 or vessel rib 230 during outward deflection of the panel 300. In any one of the pressure vessel 200 examples disclosed herein, rigid connections 454 and/or pinned connections 452 may be used in any one or more locations for attaching the panel braces 400 to the side bulkheads 206 and/or to the vessel ribs 230. However, connections for coupling the panel braces 400 to the panel 300, the side bulkheads 206, and the vessel ribs 230 may be provided in any degree of rotatability, including ranging from a non-rotatable connection (e.g., a strictly rigid connection) to a fully rotatable connection (e.g., a pinned connection 452).

Referring still to FIG. 13, the pressure vessel 200 may include a pressure containment mechanism 472 along each one of the side bulkheads 206 for sealing the side bulkhead 206 to the panel 300 to prevent leakage of internal pressure from the pressure vessel 200. The pressure containment mechanism 472 may be configured to allow for outward deflection of the panel 300 without loss of internal pressure during internal pressurization 470 (FIG. 4) of the pressure vessel 200. In addition, the pressure containment mechanism 472 may optionally be configured to allow for movement of the panel 300 along the lateral direction 118 (FIG. 7) as may occur as a result of in-plane loads on the panel 300 and/or as a result of thermal expansion or contraction of the panel 300 along the in-plane direction. In the example of FIG. 13, the pressure containment mechanism 472 may be configured as a pressure membrane 474 extending along the longitudinal direction 120 (FIG. 7) of the side bulkhead 206. In some examples, the pressure membrane 474 may be a sheet of elastomeric or flexible material (e.g., rubber, silicone, plastic) configured to accommodate relative movement of the panel 300 at least along the out-of-plane direction during internal pressurization 470 of the pressure vessel 200. A pressure membrane 474 may be adhesively bonded and/or mechanically coupled or fastened to the panel 300 and to the bulkhead top portion 210 of each side bulkhead 206. The length of the pressure membrane 474 is long enough to allow for the panel 300 to move up and down (e.g., in FIG. 13) due to out-of-plane pressure loads, but small enough to adequately span the gap between the side bulkhead 206 and the panel 300.

Referring to FIG. 14, in another example, the pressure containment mechanism 472 may comprise a block 476 of elastomeric material mounted between the bulkhead top portion 210 and the panel 300. The block 476 of elastomeric material may extend continuously along a lengthwise direction of the side bulkhead 206. For example, a block 476 of closed-cell foam may be compressed and installed between the bulkhead top portion 210 and the panel 300. The foam may accommodate outward deflection of the panel 300 while maintaining internal pressure within the pressure vessel 200. Although not shown, a block 476 of elastic material may also be mounted between the panel 300 and one or more end bulkheads 208 (FIG. 2) that may be included with the pressure vessel 200.

Referring to FIGS. 15-16, in another example, the pressure containment mechanism 472 may be configured as a plate-seal assembly 478 extending continuously along a lengthwise direction of the side bulkhead 206. A similar arrangement of the plate-seal assembly 478 may be installed along one or more end bulkheads 208 (FIG. 2) that may optionally be included with the pressure vessel 200. The plate-seal assembly 478 in FIGS. 15-16 may include a first plate 480 extending downwardly from the panel 300, a second plate 482 extending upwardly from the bulkhead top portion 210, and a seal member 484 mountable between the first plate 480 and the second plate 482. The seal member 484 may be retained with the first plate 480 or the second plate 482 and may be configured to sealingly engage a surface respectively of the second plate 482 or first plate 480.

For example, FIG. 15 illustrates the seal member 484 configured as a seal strip 486 formed of a material that bears against a surface of the second plate 482. The seal strip 486 may be formed of elastomeric material, polymeric material, ceramic material, metallic material, or any combination thereof. The plate-seal assembly 478 may include one or more spring mechanisms 488 such as a series of compression springs seated within a series of bores (not shown) arranged at spaced intervals along the length of the first plate 480. The spring mechanism 488 may be configured to constantly urge the seal strip 486 against the surface of the second plate 482 for maintaining internal pressure within the pressure vessel 200. The seal strip 486 is configured to slide along the surface of the second plate 482 for accommodating outward deflection of the panel 300 during internal pressurization 470 of the pressure vessel 200. In an alternative example, FIG. 16 illustrates the seal member 484 configured as a bulb seal 490 such as an O-ring seal retained within a slot formed along a lengthwise direction of the first plate 480. An exposed portion of the bulb seal 490 may sealingly engage the surface of the second plate 482 in a manner maintaining internal pressure within the pressure vessel 200 while accommodating outward deflection of the panel 300. Any one of a variety of alternative means may be implemented to provide for a pressure seal between the side bulkhead 206 and the panel 300 while still allowing the panel 300 to move vertically relative to the side bulkhead 206.

Referring to FIGS. 17-18, shown in each figure is a portion of an example of a pressure vessel 200 having a plurality of panel braces 400 coupling the panel 300 to a side bulkhead 206. As known the art, the axial stiffness k of an element may be expressed as:

$$k = AE/L$$

wherein A is the cross-sectional area of the element, E is the elastic modulus (i.e., modulus of elasticity or Young's modulus) of the element material, and L is the length of the element. In view of the above-described stiffness equation, the axial stiffness k of the panel braces 400 may be varied by varying the cross-sectional area A and/or by varying the elastic modulus E of the panel brace 400 (e.g., a mechanical property of the material) and/or by varying the length L of the panel braces 400. However, for a given geometric arrangement of a pressure vessel 200, the length L of each one of the panel braces 400 is fixed, leaving the other two variables (i.e., cross-sectional area A and elastic modulus E) to be specified for configuring the axial stiffness of each panel brace 400.

FIG. 17 illustrates an example in which the panel attachment nodes 342 are uniformly distributed or spaced along the panel 300. For example, in the arrangement shown in FIG. 4, the panel attachment nodes 342 may be uniformly distributed along each panel span 324. In FIG. 17, the panel braces 400 are formed from a common material (e.g., aluminum, steel, etc.) and therefore have the same elastic modulus E. The axial stiffness of the panel braces 400 in FIG. 17 may be varied by configuring the panel braces 400 with a different cross sectional area. For example, FIG. 17 shows a first panel brace 402 having a first cross-sectional area 412, a second panel brace 404 having a second cross-sectional area 414, a third panel brace 406 having a third cross-sectional area 416, a fourth panel brace 408 having a fourth cross-sectional area 418, and a fifth panel brace 410 having a fifth cross-sectional area 420. In one example, the axial stiffness of the fifth panel brace 410 may be higher than the axial stiffness of the fourth panel brace 408, which may be higher than the axial stiffness of the third panel brace 406, which may be higher than the axial stiffness of the second panel brace 404, which may be higher than the axial stiffness of the first panel brace 402. Such an arrangement may result in substantially uniform outward deflection of the panel attachment nodes 342 when the panel 300 is subjected to an out-of-plane pressure load due to internal pressurization 470 of the pressure vessel 200. Using finite element analysis or other analytical means, the cross sectional areas of the panel braces 402, 404, 406, 408, and 410 may be iterated until the vertical deflection of the panel 300 at each of the panel attachment nodes 342 is substantially identical.

FIG. 18 illustrates another example in which the panel attachment nodes 342 are uniformly spaced along each panel span 324 (FIG. 4) similar to FIG. 17. In FIG. 18, the panel braces 400 have the same cross-sectional area but are formed of different materials having correspondingly different elastic moduli, and resulting in the panel braces 400 having different axial stiffnesses resulting in substantially uniform outward deflection of the panel attachment nodes 342 when the panel 300 is subjected to an out-of-plane pressure load. For example, the first panel brace 402 is formed of a first material having a first elastic modulus 422, the second panel brace 404 panel brace 400 is formed of a second material having a second elastic modulus 424, the third panel brace 406 is formed of a third material having a third elastic modulus 426, the fourth panel brace 408 is formed of a fourth material having a fourth elastic modulus 428, and the fifth panel brace 410 is formed of a fifth material having a fifth elastic modulus 430. As a result, the axial stiffness of the fifth panel brace 410 may be higher than the axial stiffness of the fourth panel brace 408, which may be higher than the axial stiffness of the third panel brace 406, and so on in a manner similar to the arrangement described above for FIG. 17. In other examples not shown, the axial stiffness of at least two of the panel braces 400 may be varied by varying both the cross-sectional area A and the elastic modulus E (e.g., by varying the material of the panel braces 400). A trade study may be performed to determine whether varying the cross-sectional area A, the elastic modulus E, or both, is required to define a structurally efficient configuration for the pressure vessel 200 that results in substantially uniform outward deflection of the panel attachment nodes 342 when the panel 300 is subjected to an out-of-plane pressure load. Due to the difficulty in varying the elastic modulus as a result of the elastic modulus being a function of the material composition of suitable materials (e.g., commonly-available metallic materials) which typically have characteristic moduli that do not vary by several percent (e.g. aluminum has an elastic modulus varies from approximately 10.0-10.5 million pounds per square inch), variations in axial stiffness of the panel braces 400 may be more easily achieved by varying the cross sectional area. However, using panel braces 400 formed of different materials (e.g., and therefore different elastic moduli) may provide a designer with additional flexibility in defining the cross sectional areas of a set of panel braces 400 of a pressure vessel 200.

In some examples, such as in cases where the panel attachment nodes 342 are uniformly spaced along the panel 300 (e.g., FIGS. 17-18), the panel brace 400 coupling a side bulkhead 206 to the panel 300 at the panel attachment node 342 located nearest the side bulkhead 206 may have a lower stiffness than the remaining panel braces 400 coupling the side bulkhead 206 to the panel 300. For example, as described above for the panel brace 400 arrangement in FIGS. 17-18 having uniformly spaced panel attachment nodes 342, the axial stiffness of the first panel brace 402 is lower than the axial stiffness of the second, third, fourth, and fifth panel braces 404, 406, 408, 410. The relatively low axial stiffness of the panel brace 400 nearest each side bulkhead 206 may be a result of a lower bending stress at the panel side portion 326, and a progressively higher bending stress in the section of the panel span 324 between the panel side portion 326 and the panel center portion 330. However, for examples of the pressure vessel 200 in which the panel attachment nodes 342 are non-uniformly spaced, the axial stiffness of the panel braces 400 may be other than a gradually increasing stiffness of the panel braces 400 from the panel side portion 326 to the panel center portion 330 of each panel span 324.

Figure 19:
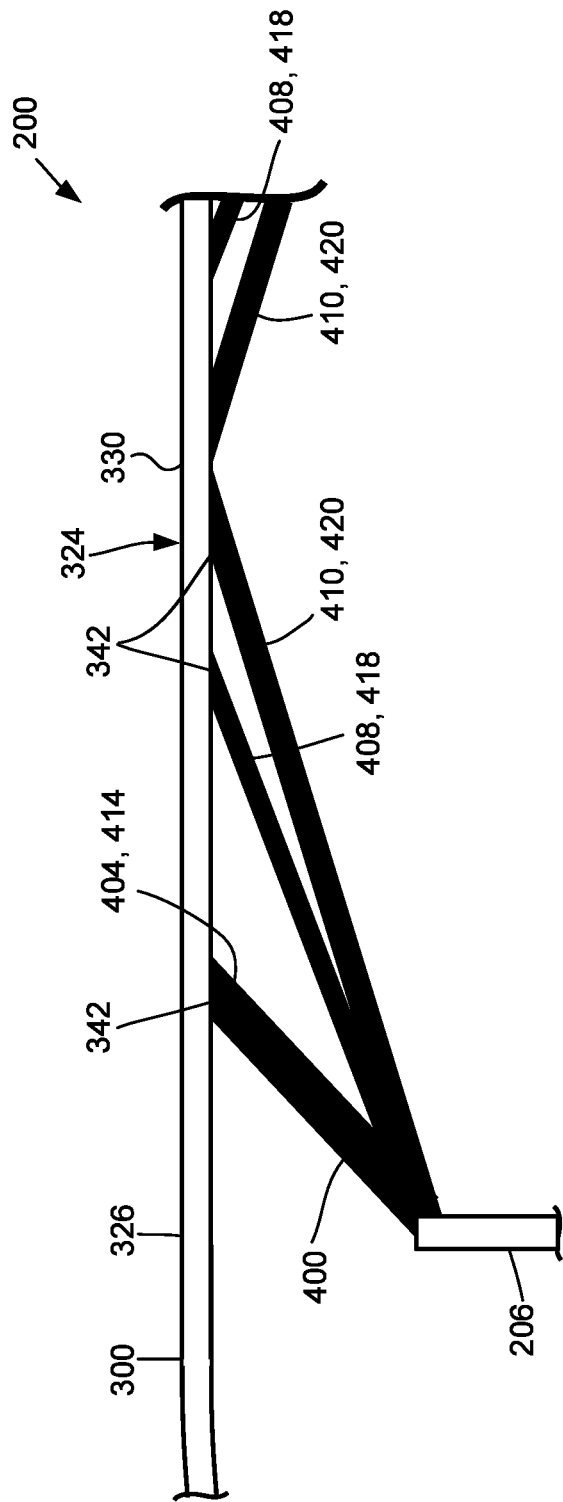
FIG. 19 shows a portion of an example of a pressure vessel in which the panel attachment nodes are non-uniformly spaced and further illustrating the panel brace nearest the side bulkhead having an increased axial stiffness relative to the remaining panel braces.

FIG. 19 illustrates an example in which the panel attachment nodes 342 are non-uniformly spaced. In the example shown, the first panel brace 402 and the third panel brace 406 are omitted, and the pressure vessel 200 includes only the second, fourth, and fifth panel braces 404, 408, and 410. As a result of the omission of the first and third panel braces 402, 406 from FIG. 19 and the increased spacing between the second and forth panel braces 404, 408, the out-of-plane pressure load that would otherwise be carried by the first and third panel braces 402, 406 (e.g., in FIGS. 17-18) is now (e.g., in FIG. 19) carried by the second panel brace 404. The increased axial load in the second panel brace 404 dictates an increased axial stiffness in order to achieve substantially equal deflections of the panel attachment nodes 342 in FIG. 19. As mentioned above, increased axial stiffness of the second panel brace 404 may be achieved by increasing the cross-sectional area and/or by using a brace material having a higher elastic modulus. FIG. 19 shows an increased cross-sectional area of the second panel brace 404 relative to the cross-sectional area of the fourth and fifth panel braces 408, 410.

Figure 21:
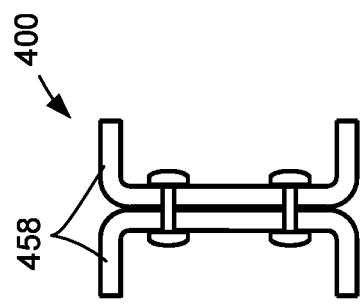
FIG. 21 is a cross-sectional view of an example of a panel brace comprised of back-to-back channels providing a fail-safe configuration.
Figure 20:
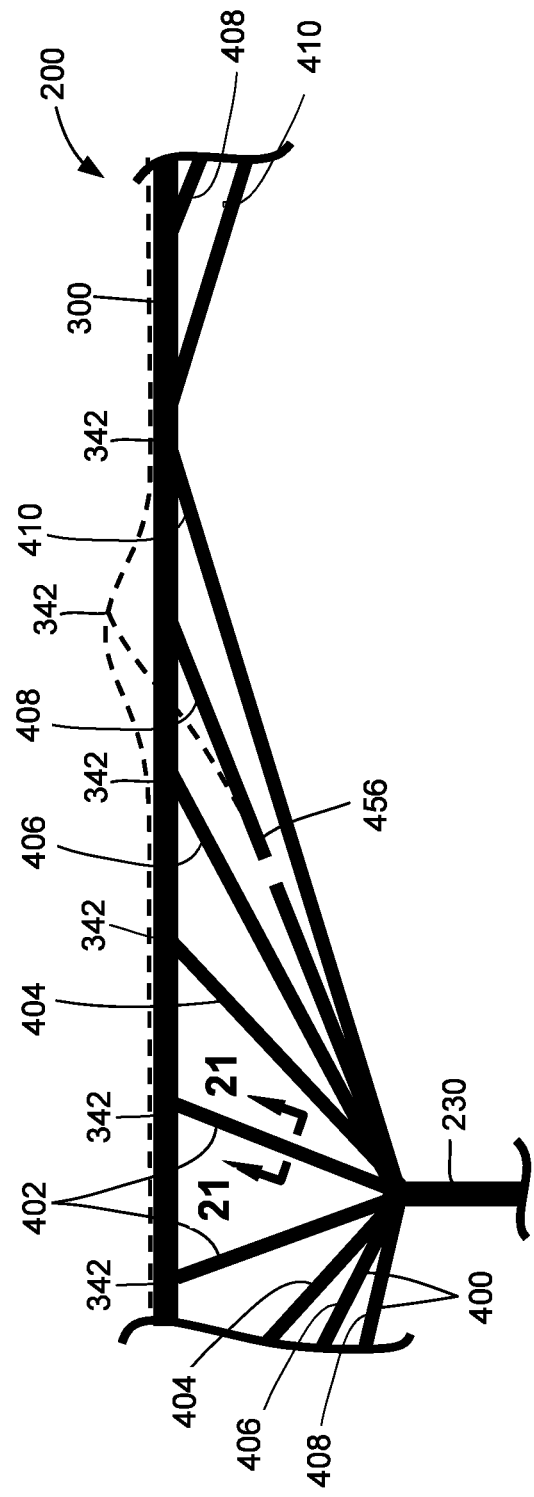
FIG. 20 is an example of a portion of a pressure vessel having increased outward deflection of the panel at a panel attachment node of a failed brace.

Referring to FIG. 20, shown is a portion of an example of a pressure vessel 200 having a plurality of panel braces 400 coupling the panel 300 to a vessel rib 230. FIG. 21 is a sectional view of one of the panel braces 400 of FIG. 20. The panel 300 and/or at least one of the panel braces 400 may have a fail-safe configuration (i.e., is configured for fail-safety) to prevent failure of the panel 300 in the event of a failure of one of the panel braces 400 during internal pressurization 470 (FIG. 4) of the pressure vessel 200. In the above-describe example of a centerbody 110 configured as a pressure vessel 200, the fail-safe configuration of the panel braces 400 may prevent failure of the panel during flight. In the present disclosure, failure of the panel 300 may be described as global buckling of the panel 300 as a result of excess deflection. In this regard, the beam-column behavior of a panel 300 simultaneously subjected to in-plane loads and out-of-plane loads may be exacerbated if there is excessive deflection of the panel 300. In FIG. 20, if the fourth panel brace 408 is ineffective in restraining outward deflection of its panel attachment node 342, the increased span between the third and fifth panel braces 406, 410 may precipitate buckling at a lower in-plane load in the panel 300 than would be the case if the fourth panel brace 408 were intact.

In one example of a fail-safe configuration, at least one of the panel braces 400 may have an axial strength capability that prevents failure of the panel 300 in the event of a failure of another one of the panel braces 400, such as the failed brace 456 shown in FIG. 19. The axial strength of a panel brace 400 may be described as the magnitude of the axial load at which the panel brace 400 plastically yields or deforms and/or is no longer able to carry the amount of axial load with the panel brace 400 in its original condition. As shown in FIG. 19, a failed brace 456 may be fractured or broken to an extent that the failed brace 456 is incapable of carrying axial load and may be incapable of limiting outward deflection of the panel attachment node 342. In this regard, a failed brace 456 may result in localized outward deflection of the panel attachment node 342 by an amount that causes the allowable bending stress of the panel 300 to be exceeded, and which may result in plastic deformation, yielding, or failure (e.g., buckling) of the panel 300.

FIG. 21 shows another example of a fail-safe configuration in which the panel brace 400 has a residual axial strength capability and a residual axial stiffness capability configured to prevent failure of the panel 300 in the event of a failure of the same panel brace 400. In this regard, the panel brace 400 may be configured to continue carrying axial load in the event of plastic deformation or fracturing of a portion of the same panel brace 400. For example, the panel brace 400 in FIG. 21 is configured as a pair of C-channels 458 in back-to-back arrangement and mechanically fastened to each other. Each one of the C-channels 458 may be configured such that if one of the C-channels 458 fails (e.g., develops a fatigue crack), the remaining C-channel 458 has an axial strength and stiffness capability to prevent the failure of the panel 300 (e.g., buckling) otherwise occurring due to excessive localized outward deflection of the panel 300, similar to the above-described example shown in FIG. 19. Although the residual axial strength and axial stiffness capability of the panel brace 400 in FIG. 21 may result in non-uniform outward deflection of the panel attachment nodes 342, the residual axial strength and stiffness capability of the panel brace 400 may prevent buckling of the panel 300.

In another example of a fail-safe configuration, the panel 300 may have a bending load capability configured to prevent failure of the panel 300 in the event of a failed brace 456 (FIG. 19). In the present disclosure, the bending load capability of the panel 300 may be described as the capability of the panel 300 to resist local bending to an extent that causes buckling of the panel 300. In one example, a panel 300 may be configured as a monocoque panel 314 (FIGS. 12-13) having a skin member 316 and a plurality of stringers 318 as described above. If one of the panel braces 400 fails (e.g., the failed brace 456 in FIG. 19), the stringers 318 or the combination of stringers 318 and skin member 316 have a bending load capability that allows the monocoque panel 314 to withstand the additional bending stress imposed on the monocoque panel 314 as a result of the failed brace 456, and thereby allows the panel 300 to avoid buckling that would otherwise occur. The panel 300 may be provided in a variety of alternative configurations (i.e., other than monocoque panel) having a bending load capability configured to prevent failure of the panel 300 in the event of a failed brace 456. For example, the panel 300 may be configured as a constant-thickness plate 302 (FIGS. 5-6), as an integrally-stiffened panel 310 (FIG. 7), as a sandwich panel 304 (FIG. 9), or in other configurations.

Referring to FIG. 22, shown is cross-sectional view of an example of a pressure vessel 200 in which the substantially flat panel 300 is slightly curved. In the example shown, the panel 300 may be described as a simply curved panel that is curved in one direction and having an arch shape. The panel 300 may have a degree of curvature such that the panel side portions 326 are non-tangent to the respective bulkhead top portions 210. For the example shown in FIG. 22, the side portion angle 329 between each side bulkhead 206 and a tangent 328 to the panel side portion 326 may be between approximately 90-120 degrees.

Although FIG. 22 shows the panel 300 having a constant radius of curvature, any one of the panel configurations disclosed herein may have a variable radius of curvature along any one of more directions. For example, in addition to being curved along the lateral direction 118 (FIG. 2), a panel (not shown) may also be curved along the longitudinal direction 120 and which may result in the panel 300 having curvature in both directions. In one example, a panel 300 may be complexly curved along one direction or along two or more directions. Alternatively, the substantially flat panel 300 may be planar.

As mentioned above, the panel 300 may have a variety of different construction configurations. For example, FIGS. 5-6 illustrate a panel 300 configured as a constant-thickness plate 302. In this regard, such constant-thickness plate 302 may be monolithic comprising a single material of any type including, but not limited to, metallic material (e.g., aluminum), fiber-reinforced polymer matrix material (e.g., carbon-fiber reinforced epoxy composite), or any one of a variety of other materials or combinations of materials. FIG. 7 illustrates an example of a panel 300 configured as integrally-stiffened panel 310 having a plurality of integral plate ribs 312 (shown as phantom lines on one corner of the panel 300). The integral plate ribs 312 may be integrally formed in a desired geometric pattern such as an integrally machined isogrid pattern in which the integral plate ribs 312 are oriented at 60 degrees to each other. However, the integral plate ribs 312 of an integrally-stiffened panel 310 may be oriented at any angle (e.g., 90 degrees) relative to each other.

Referring briefly to FIGS. 12-13, shown is an example of a panel 300 configured as a monocoque panel 314 as described above and having a skin member 316 and a plurality of stringers 318 which may be separately manufactured and coupled (e.g., mechanically fastened and/or adhesively bonded) to the skin member 316. The plurality of stringers 318 may be oriented along a common direction such as along the lateral direction 118 (FIG. 7). Alternatively, the plurality of stringers 318 may be oriented along two or more directions such as along the lateral direction 118 and along the longitudinal direction 120 (FIG. 7).

Referring briefly to FIG. 9, shown is an example of a panel 300 configured as a sandwich panel 304 having a spaced pair of face sheets 306 interconnected by a core 308. The face sheets 306 may be thin relative to the thickness of the core 308, and may be formed of a composite material and/or metallic material. In the example shown, the core 308 may have a constant thickness. However, in an alternative configuration, the core 308 may have a non-constant thickness. The core 308 may be formed of a relatively lightweight material such as foam, honeycomb, or any one a variety of other materials.

Referring to FIG. 23, shown is a top-down view of an example of a pressure vessel 200 having vessel ribs 230 at different orientations. The pressure vessel 200 includes an opposing pair of side bulkheads 206 and an opposing pair of end bulkheads 208 interconnecting the side bulkheads 206. The side bulkheads 206 and end bulkheads 208 defining an outer perimeter of the pressure vessel 200. In the example shown, the vessel ribs 230 include a first pair of vessel ribs 230 oriented parallel to each other and orthogonal to a second pair of vessel ribs 230. The side bulkheads 206, end bulkheads 208 and vessel ribs 230 divide the panel 300 into an orthogonal pattern of panel spans 324. However, in other examples of pressure vessels 200, the vessel ribs 230 may be non-parallel to each other and/or non-parallel to the side bulkheads 206 and/or to the end bulkheads 208.

FIG. 24 shows an example of a pressure vessel 200 having side bulkheads 206 and end bulkheads 208 defining the outer perimeter of the pressure vessel 200 and having vessel ribs 230 oriented non-parallel to each other and/or non-parallel to the side bulkheads 206. The side bulkheads 206, end bulkheads 208 and vessel ribs 230 divide the panel 300 into a tessellated pattern of panel spans 324 which, in the example shown, define a hexagonal pattern. As may be appreciated, the side bulkheads 206, end bulkheads 208 and vessel ribs 230 may be arranged in any one of a variety of orientations relative to each other to define any one of a variety of shapes and patterns of the panel spans 324. The tessellations shown in FIGS. 23 and 24 are uniform in that the shapes bounded by the side bulkheads 206, end bulkheads 208 and vessel ribs 230 are approximately the same size and/or shape. However, a pressure vessel 200 may have side bulkheads 206, end bulkheads 208, and vessel ribs 230 that result in any one of the variety of tessellations of irregular size and/or irregular shape.

FIGS. 25-27 are cross-sectional view of examples of different panel configurations presented for the purpose of illustrating the improvements in structural efficiency achieved by using panel braces 400 (FIG. 22) to support a substantially flat panel 300 of a pressure vessel 200. In each of FIGS. 25-27, the panel 300 is configured as a sandwich panel 304 having opposing face sheets 306 separated by a core 308, as shown in FIG. 9 and described above. The panel 300 is subjected to a uniform out-of-plane pressure load, and is optimized such that the maximum face sheet stress (e.g., in-plane tension) at any location in the panel 300 is 60 kilopounds per square inch (ksi).

FIG. 25 is a cross-sectional view of a 2-inch thick panel supported by 6 strength braces 348 that are sized for axial strength. In the present disclosure, strength braces 348 are sized for axial strength, and are distinguished from panel braces 400 (FIG. 22) which are sized for axial stiffness such that the outward deflections (e.g., vertical deflections) of the panel 300 are uniform. In the present example, sizing a strength brace 348 for axial strength may be described as sizing the brace to prevent the face sheets 306 from exceeding the above-mentioned maximum face sheet stress (i.e., 60 ksi), and which may result in non-uniform outward deflection of the panel 300 under the out-of-plane pressure load. In FIG. 25, the maximum deflection of the panel 300 at the panel center portion 330 is 2.606 inches.

FIG. 26 is a cross-sectional view of a 2-inch thick panel supported by 12 strength braces 348. The maximum deflection at the panel center portion 330 is 2.585 inches which is slightly less than the maximum deflection of 2.606 inches at the panel center portion 330 in FIG. 26. The variation in outward deflection of the panel attachment nodes 342 is reduced in FIG. 26 relative to the increased variation in outward deflection of the panel attachment nodes 342 in FIG. 25, which illustrates that the deflected shape 344 of a panel 300 is strongly influenced by the sizing of the strength braces 348.

FIG. 27 is a cross-sectional view of a 4-inch thick panel supported by 12 strength braces 348. The maximum deflection at the panel center portion 330 is 2.376 inches which is less than the maximum deflection of 3.017 inches at the panel center portion 330 in FIG. 26. However, the deflected shape 344 of the panel 300 in FIG. 27 is substantially similar to the deflected shape 344 of the panel 300 in FIG. 26, illustrating the relatively strong effect of the brace sizing on the deflected shape 344 of the panel 300 and the comparatively small effect of panel thickness 340 on the deflected shape 344. In any one of the pressure vessel 200 examples disclosed herein, the increase in structural efficiency provided by the panel braces 400 may be greater for relatively long panel spans relative to the structural efficiency of pressure vessels 200 having a shorter panel spans.

Figure 28:
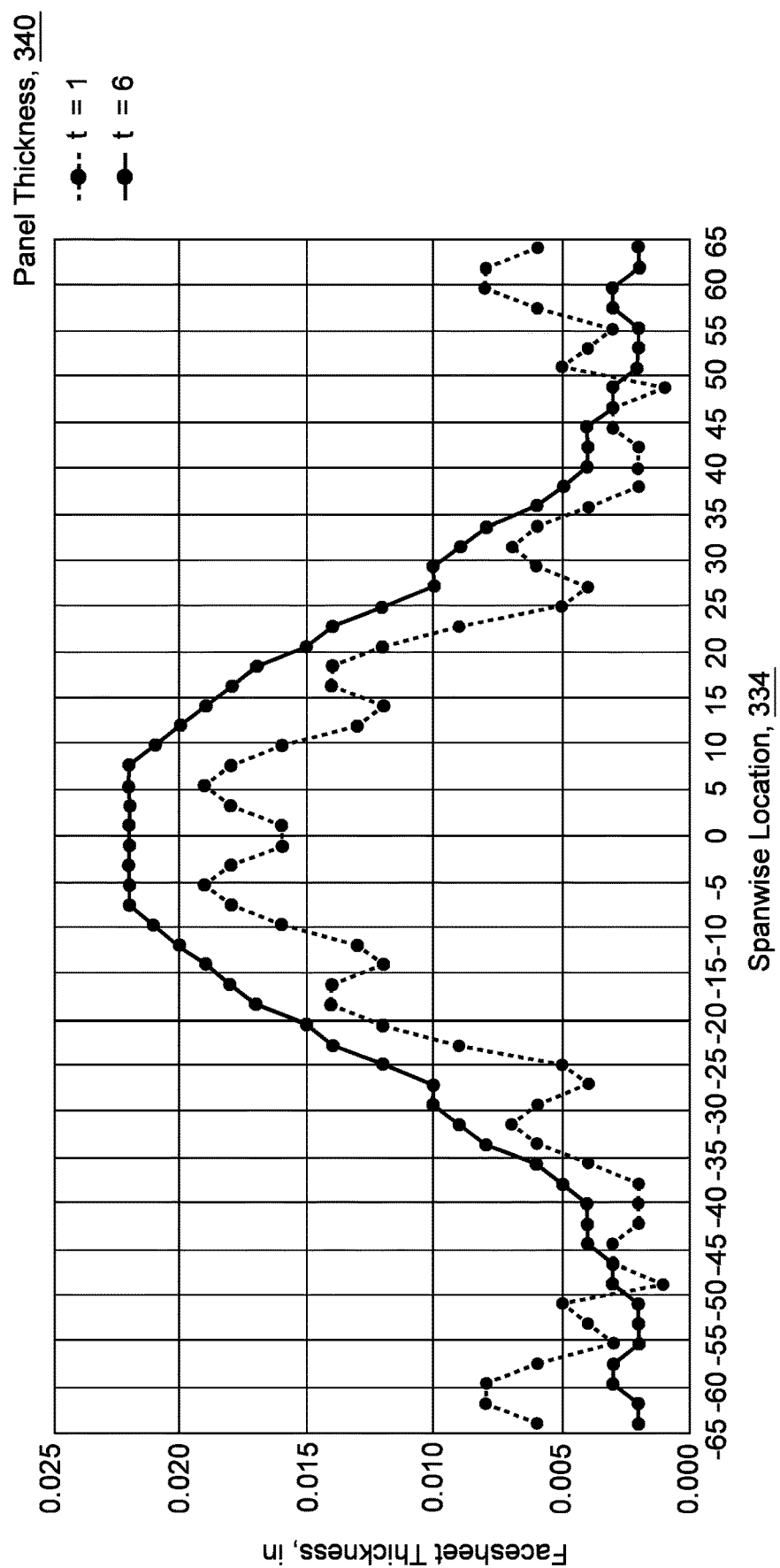
FIG. 28 is a graph of face sheet thickness vs. spanwise location for two (2) sandwich panels having two (2) different panel thicknesses and each supported by 10 strength braces and each subjected to an out-of-plane pressure load.
Figure 29:
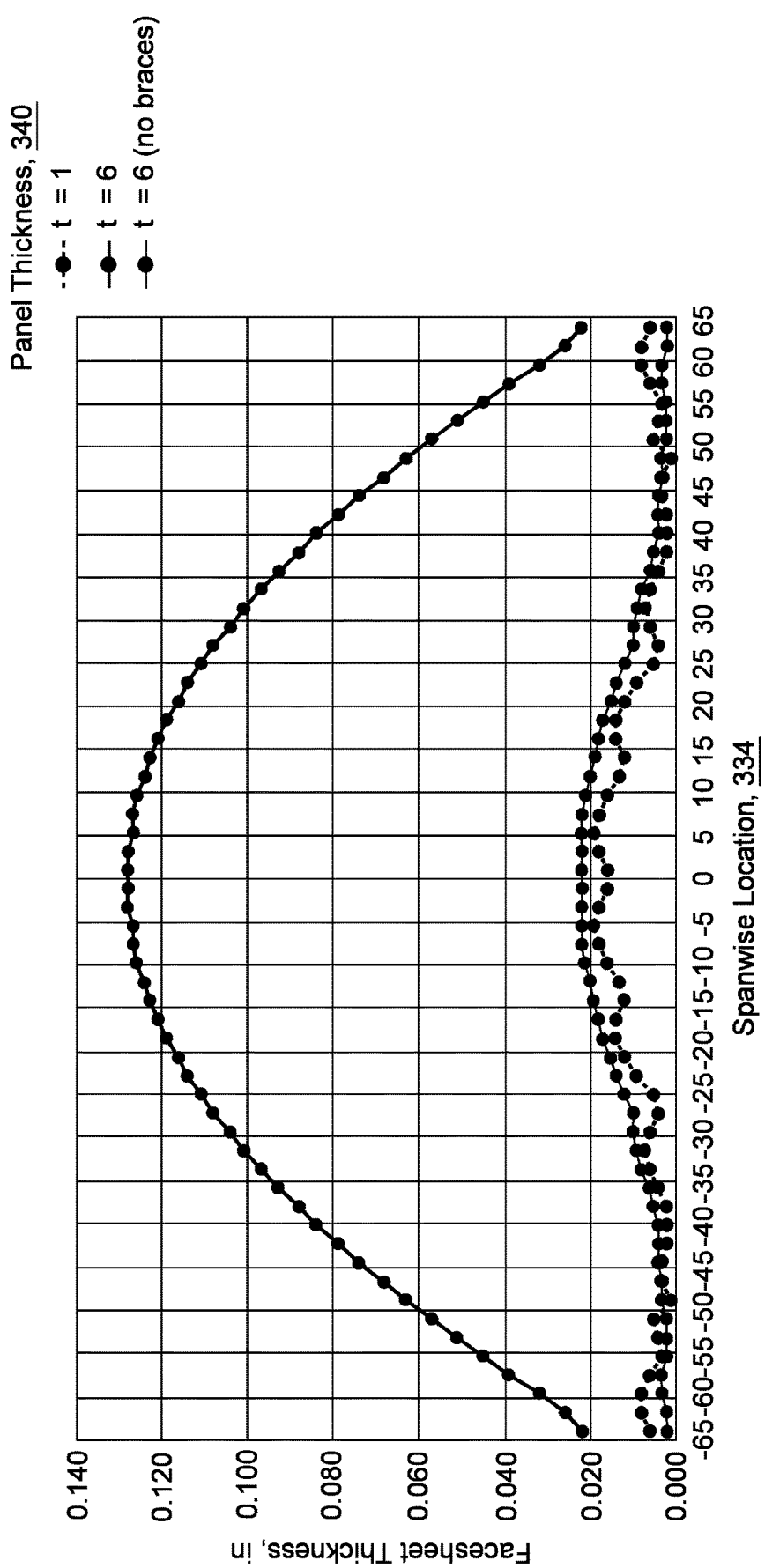
FIG. 29 is a graph of face sheet thickness vs. spanwise location for three (3) sandwich panels including the two (2) sandwich panels represented in FIG. 28 and further including a 6-inch thick panel having no strength braces.
Figure 30:
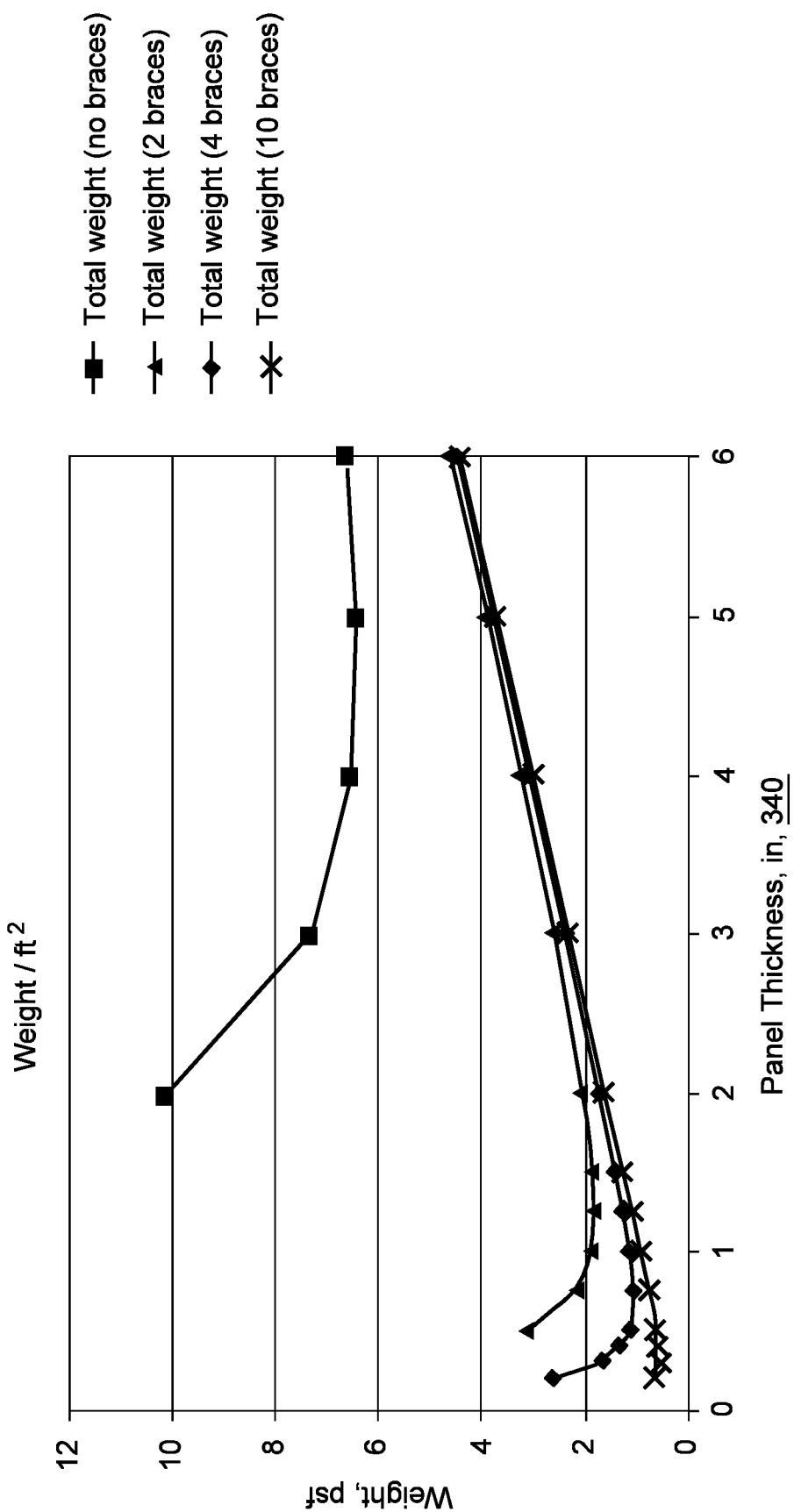
FIG. 30 is a graph of total weight-per-unit-area vs. panel thickness for several panel configurations.

FIGS. 28-30 are graphs of the weight of sandwich panels 304 (FIG. 9) having different panel thicknesses 340 (FIG. 9). The graphs are presented for the purpose of illustrating the weight savings achieved by using panel braces 400 (FIG. 22) to support a substantially flat panel 300 (FIG. 22) of a pressure vessel 200 (FIG. 22). Each sandwich panel 304 is subjected to a uniform out-of-plane pressure load and is optimized such that the maximum face sheet stress is 60 ksi.

FIG. 28 is a graph of face sheet thickness 341 vs. spanwise location 334 for two (2) sandwich panels 304 having different panel thicknesses 340. One of the sandwich panels 304 has a 1-inch panel thickness 340 and the other sandwich panel 304 has a 6-inch panel thickness 340. Each sandwich panel 304 is supported by 10 strength braces 348 (FIGS. 25-27). The variation in face sheet thickness 341 across the width (e.g., span) of the sandwich panel 304 is a result of the above-mentioned optimization in which the maximum face sheet stress (e.g., in-plane tension) at any location in the sandwich panel 304 is 60 ksi. The graph of FIG. 28 shows that the face sheet thickness 341 of the 1-inch thick sandwich panel 304 is generally (i.e., at a majority of spanwise locations) less than the face sheet thickness 341 of the 6-inch thick sandwich panel 304 as a result of the 6-inch thick sandwich panel 304 carrying a greater portion of the out-of-plane pressure load in panel bending than the portion of panel bending carried by the 1-inch thick sandwich panel 304.

FIG. 29 is a graph of face sheet thickness 341 vs. spanwise location 334 for three (3) sandwich panels 304 including the two (2) sandwich panels 304 represented in FIG. 25 and further including a 6-inch thick sandwich panel 304 having no strength braces. The graph of FIG. 29 shows that the face sheet thickness 341 of the braced panels is significantly less than the face sheet thickness 341 of the non-braced panel, thereby illustrating the weight savings achieved by supporting the sandwich panel 304 with strength braces 348. FIG. 30 is a graph of total weight-per-unit-area vs. panel thickness 340 for several panel configurations including a sandwich panel 304 with no strength braces 348, a sandwich panel 304 supported by two (2) strength braces 348, a sandwich panel 304 supported by four (4) strength braces 348, and a sandwich panel 304 supported by 10 strength braces 348. The total weight in FIG. 30 is the sum of the weight of the panel 300 plus the weight of the panel braces 400. As shown in the graph, an increase in the total quantity of strength braces 348 supporting a panel 300 generally results in a decrease in the weight-per-unit-area of the panel 300, thereby illustrating the weight savings achieved as a result of using panel braces 400 to support a panel 300.

Figure 31:
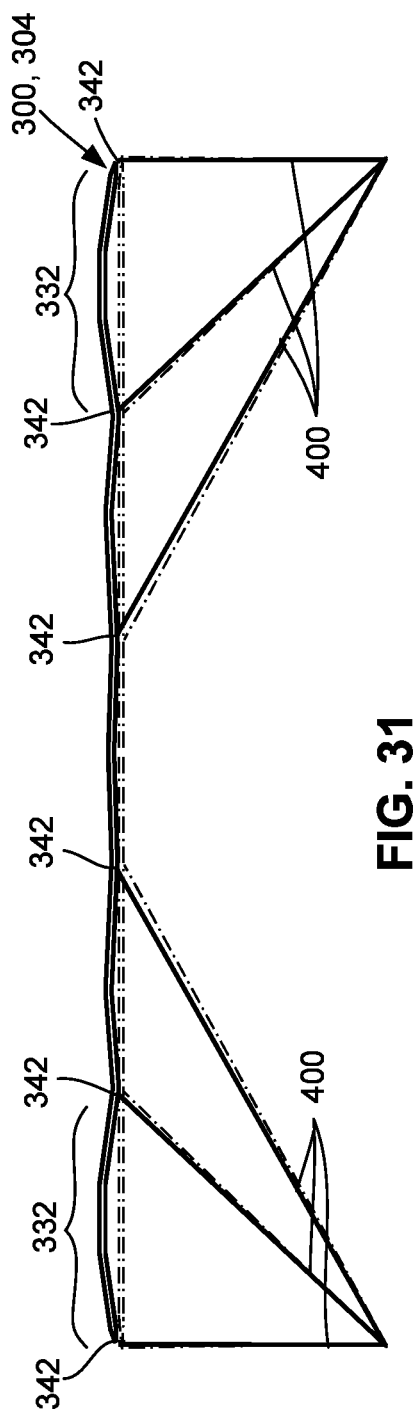
FIG. 31 is a cross-sectional view of an example of a panel supported by 4 panel braces tuned for axial stiffness.
Figure 32:
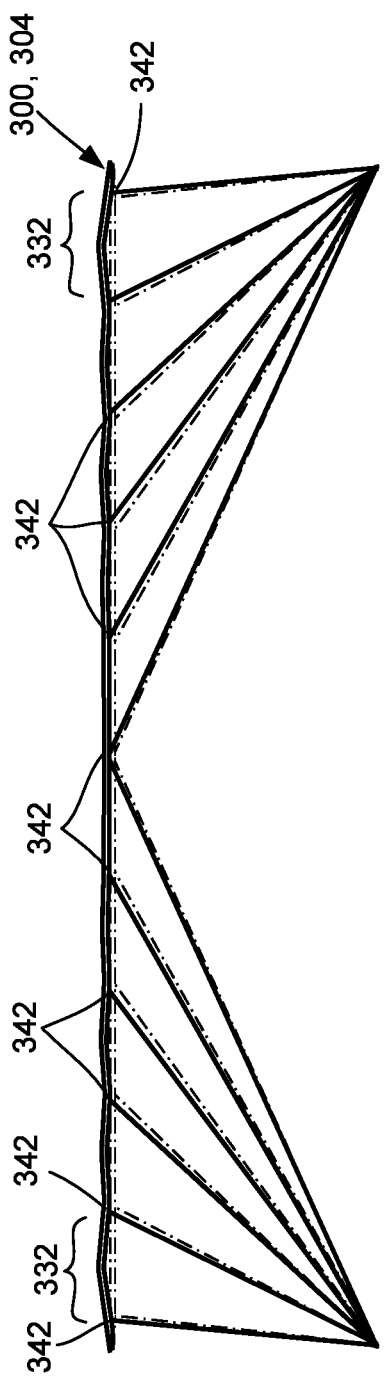
FIG. 32 is a cross-sectional view of an example of a panel supported by 12 panel braces tuned for axial stiffness.

FIGS. 31-32 are cross-sectional side views of sandwich panels 304 of different panel thicknesses 340 (FIG. 9) and supported by different quantities of panel braces 400. However, as indicated above, the presently-disclosed pressure vessels 200 with panel braces 400 may be implemented with panels 300 having any one a variety of different panel configurations, and is not limited to sandwich panels 304. As mentioned above, the panel braces 400 are configured for axial stiffness such that each sandwich panel 304 undergoes substantially uniform outward deflection at the panel attachment nodes 342 when the sandwich panel 304 is subjected to the out-of-plane pressure load. FIG. 31 shows a sandwich panel 304 supported by 4 panel braces 400 tuned for axial stiffness. Although the panel attachments nodes 342 are deflected outwardly by substantially uniform amounts, the panel 300 exhibits panel bending in the panel segment 332 nearest the panel side portions 326. FIG. 32 shows a sandwich panel 304 of the same panel thickness 340 as in FIG. 31, and supported by 12 panel braces 400 tuned for axial stiffness in a manner resulting in substantially uniform outward deflection at the panel attachment nodes 342. FIG. 32 shows a reduced amount of outward deflection between the panel attachment nodes 342 relative to the amount of outward deflection between the panel attachment nodes 342 in FIG. 31, and illustrating the effect of brace quantity on reducing variations in the magnitude of outward deflection of the panel 300 between the panel attachment nodes 342.

Figure 33:
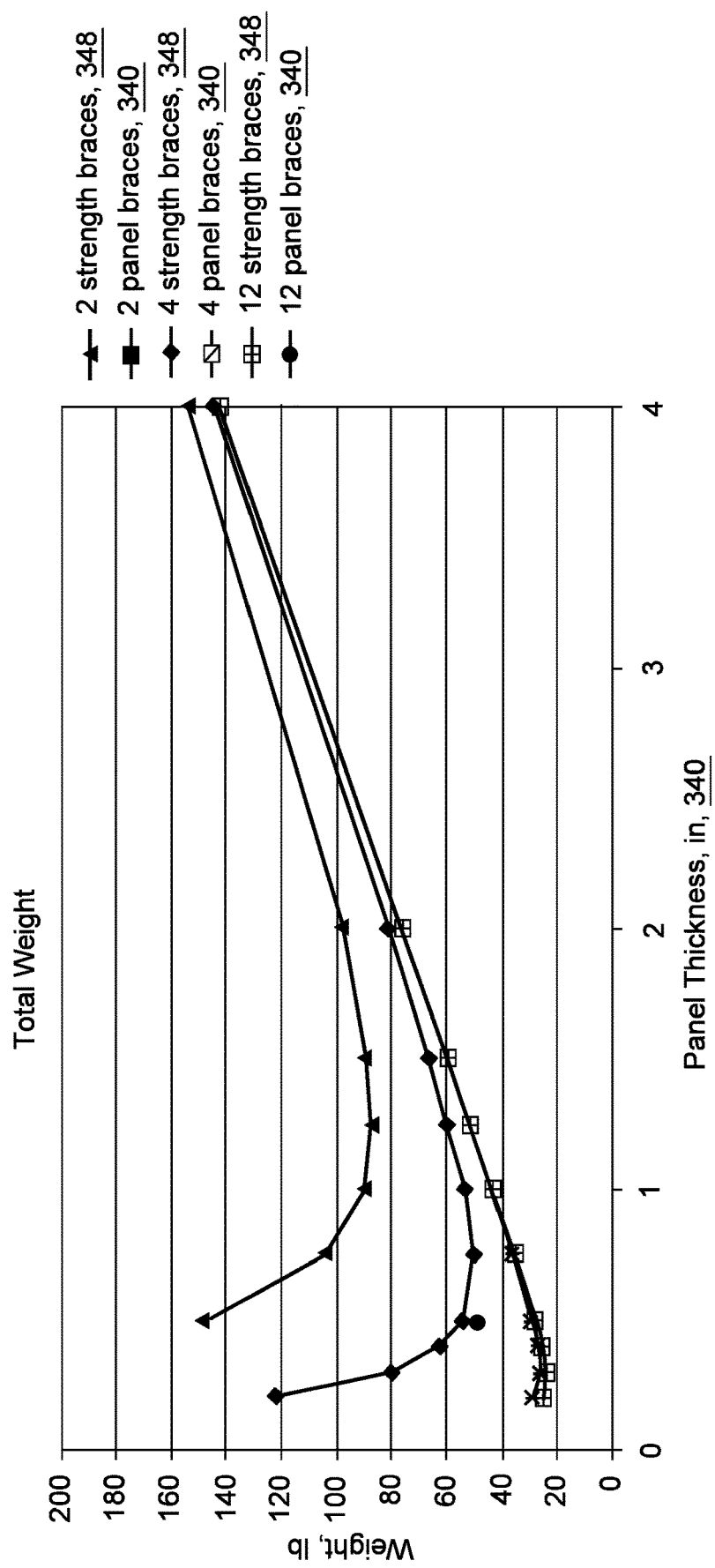
FIG. 33 is a graph of total panel weight vs. panel thickness for several panel configurations.

FIG. 33 is a graph of total panel weight vs. panel thickness 340 for several panel configurations in which the sandwich panel 304 is subjected to a uniform out-of-plane pressure load as described above. The panel configurations include a 1-inch thick sandwich panel 304 supported by two (2) strength braces 348 sized for axial strength, a sandwich panel 304 supported by two (2) panel braces 400 sized for axial stiffness, a sandwich panel 304 supported by four (4) strength braces 348, a sandwich panel 304 supported by four (4) panel braces 400 sized for axial stiffness, a sandwich panel 304 supported by 12 panel braces 400 sized for axial stiffness, and a sandwich panel 304 supported by 12 panel braces 400 sized for axial stiffness. The graph of FIG. 33 shows that increasing the quantity of panel braces 400 generally reduces the total panel weight which may be described as the combined weight of the sandwich panel 304 and the panel braces 400. Although the graph illustrates a small weight increase for the sandwich panels 304 supported by panel braces 400 (i.e., tuned for axial stiffness) in comparison to a reduced weight for the corresponding sandwich panels 304 supported by strength braces 348, the small weight increase is due to the larger size (e.g., greater axial stiffness) and corresponding increased weight of the braces (e.g., panel braces 400 or strength braces 348) that are connected to the panel attachment nodes 342 at the panel center portion 330.

In designing a pressure vessel 200, in addition to sizing the panel braces 400 for axial stiffness to achieve substantially uniform outward deflection at the panel attachment nodes 342 when the panel 300 is under an out-of-plane pressure load, it may also be necessary to analyze the panel 300 for buckling under compression loading. For example, a pressure vessel 200 configured as a payload bay 108 of the above-described blended-wing-body aircraft 100 may be subjected to flight loads that place the panel 300 under in-plane tension, compression, and/or shear, and which may cause the panel 300 to fail or buckle. If the analysis indicates that the panel 300 will buckle when subjected to the in-plane loads with or without the out-of-plane pressure loads, then the panel 300 must be resized to avoid such failure. A re-sized panel may have increased bending stiffness, and which may necessitate re-sizing the panel braces 400 for axial stiffness so that they are stiff enough to preclude buckling of the panel 300. In this regard, when re-sizing the panel braces 400, the panel braces 400 must each be configured to have an axial stiffness that results in substantially uniform outward deflection of the panel attachment nodes 342.

Figure 34:
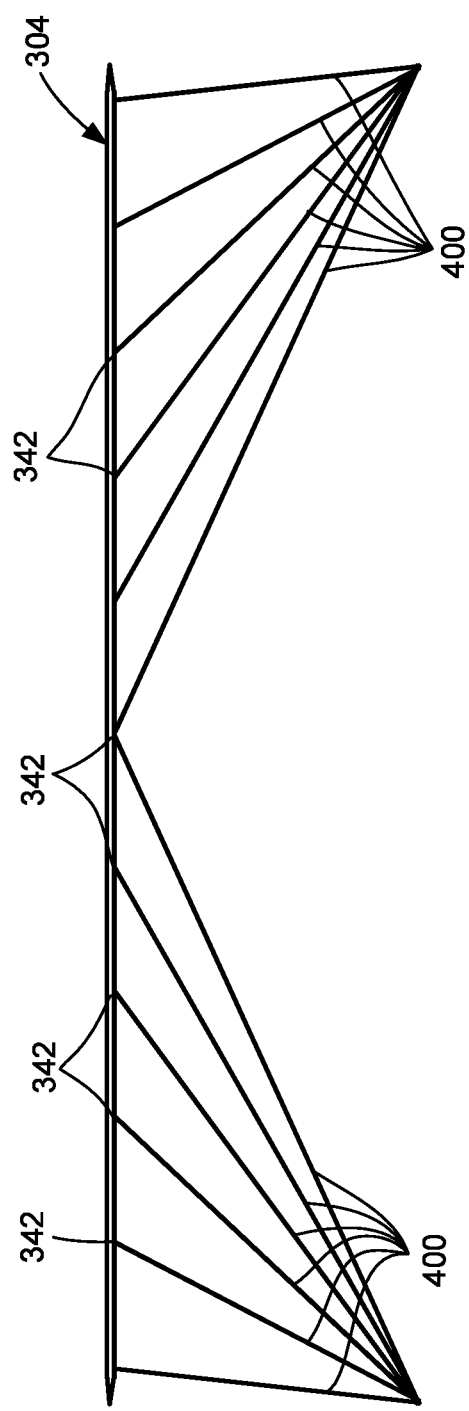
FIG. 34 is a cross-sectional view of an example of a panel supported by 12 panel braces and subjected to an out-of-plane pressure load and an in-plane buckling load.

As an example of the above-described re-sizing process, FIG. 34 is a cross-sectional view of an example of a sandwich panel 304 supported by 12 panel braces 400 and subjected to an out-of-plane pressure load for which the panel braces 400 are initially configured to have an axial stiffness that results in uniform outward deflection of the panel attachment nodes 342. After configuring the panel braces 400, the panel 300 is subjected to an in-plane buckling load (e.g., a compression load) while being subjected to the out-of-plane pressure load. As a result of the in-plane buckling load, the panel 300 may exhibit very small variations in the amount of outward deflection at the panel attachment nodes 342. As described above, the panel braces 400 may be re-configured by changing the cross-sectional area and/or the elastic modulus of one or more of the panel braces 400 to have an axial stiffness that results in uniform outward deflection of the panel attachment nodes 342.

Figure 35:
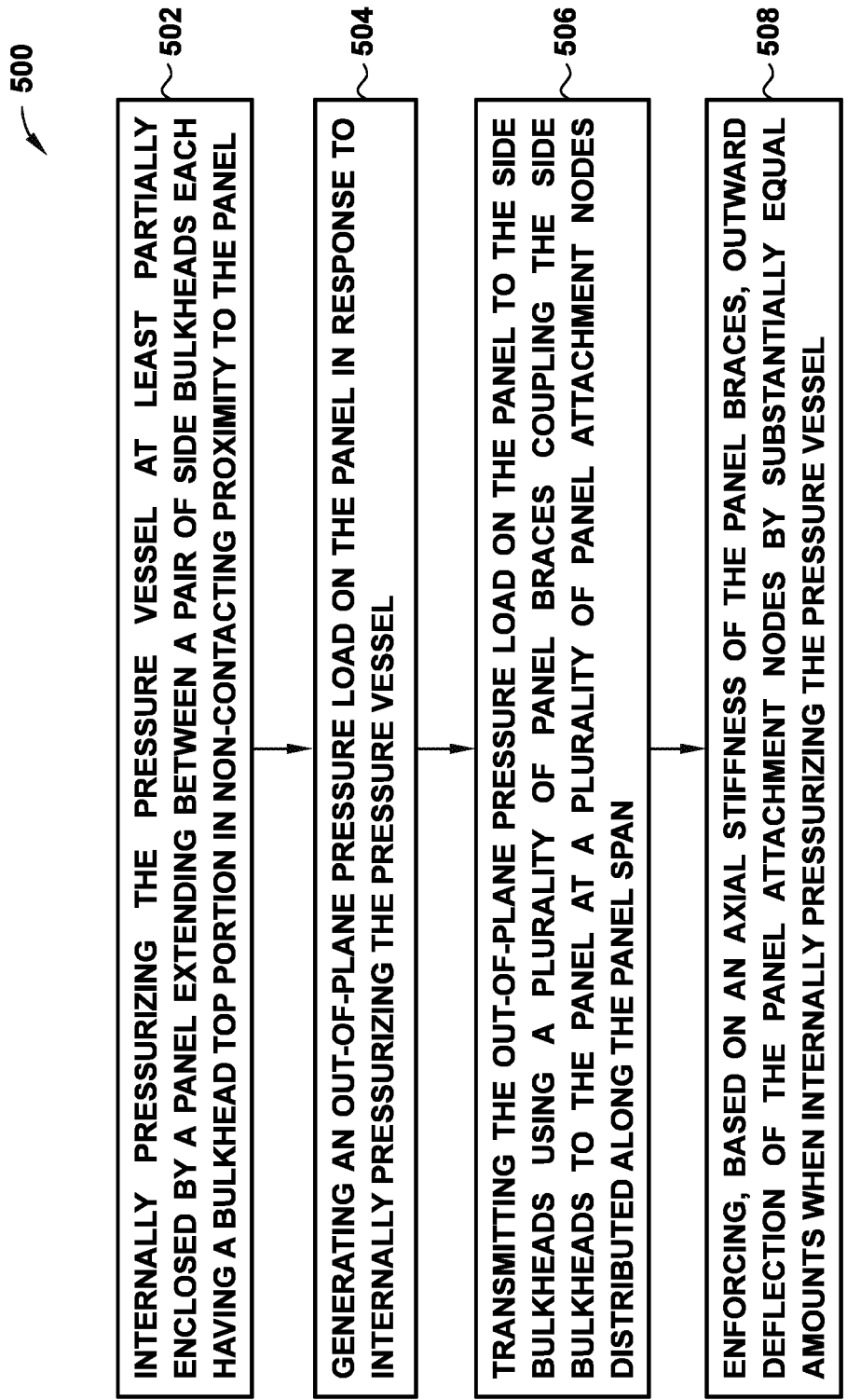
FIG. 35 is a flowchart of operations included in method of loading a pressure vessel.

FIG. 35 is a flowchart of operations included in a method 500 of loading a pressure vessel 200. The method 500 includes step 502 of internally pressurizing the pressure vessel 200 which, as described above, is at least partially enclosed by a panel 300 having at least one panel span 324 extending between a pair of side bulkheads 206 each having a bulkhead top portion 210 in non-contacting proximity to the panel 300. In the example of an aircraft 100, the pressure vessel 200 comprises a passenger cabin 112 and/or a cargo hold 114, and the panel 300 may function as an aerodynamic surface 116 of the aircraft. In such an arrangement, the method may include sustaining flight loads on the panel 300 during pressurization of the passenger cabin 112 and/or the cargo hold 114.

Step 504 of the method 500 includes generating an out-of-plane pressure load on the panel 300 in response to internally pressurizing the pressure vessel 200. The pressure load is uniformly distributed on the panel 300. In the example of a passenger cabin 112 and/or a cargo hold 114 of an aircraft, the out-of-plane pressure load on the panel 300 may be effected by pumping conditioned air into the passenger cabin 112 and/or cargo hold 114.

Step 506 of the method 500 includes transmitting the out-of-plane pressure load from the panel 300 to the side bulkheads 206 using a plurality of panel braces 400 coupling the side bulkheads 206 to the panel 300 at a plurality of panel attachment nodes 342 distributed along the panel span 324. In some examples, the method may include transmitting the out-of-plane pressure load from the panel 300 to at least one vessel rib 230 using a plurality of panel braces 400 coupling the rib top portion 232 to a plurality of panel attachment nodes 342 distributed along the at least one panel span 324. As shown in the figures, the one or more vessel ribs 230 are located between the side bulkheads 206 and are in non-contacting proximity to the panel 300. The method 500 may additionally include transmitting, using a plurality of panel braces 400, the out-of-plane pressure load from the panel 300 to one or more end bulkheads 208 located on at least one of opposing ends of the pressure vessel 200.

In some examples (e.g., FIGS. 17-18), step 506 of transmitting the out-of-plane pressure load from the panel 300 to the side bulkheads 206 may include transmitting the out-of-plane pressure load using at least one panel brace 400 having a cross-sectional area and a corresponding axial stiffness that is different than the cross-sectional area and corresponding axial stiffness of one or more of the remaining panel braces 400 coupling the pair of side bulkheads 206 to the panel 300. Alternatively or additionally, step 506 may include transmitting the out-of-plane pressure load using at least one panel brace 400 having an elastic modulus and a corresponding axial stiffness that is different than the elastic modulus and corresponding axial stiffness of one or more of the remaining panel braces 400 coupling the pair of side bulkheads 206 to the panel 300.

Step 506 of transmitting the out-of-plane pressure load from the panel 300 to the side bulkheads 206 may also include transmitting the out-of-plane pressure load to at least one of the side bulkheads 206 using the panel brace 400 connected to a panel attachment node 342 nearest the side bulkhead 206. As mentioned above, such panel brace 400 may be configured with a lower axial stiffness than the remaining panel braces 400 due to a reduced magnitude of bending moment on the panel 300 at the panel attachment node 342 nearest the side bulkhead 206. Step 506 may include allowing, using a pinned connection 452 (FIG. 9), rotation of the panel 300 relative to the panel brace 400 at the panel attachment node 342. Alternatively, step 506 may include preventing, using a rigid connection 454 (FIGS. 12-13), rotation of the panel 300 relative to the panel brace 400 at the panel attachment node 342. Depending upon the type of loading and the amount of outward deflection of the panel 300, it may be advantageous that some of the panel braces 400 are coupled to a panel attachment node 342 using a pinned connection 452, and other panel braces 400 are coupled to other panel attachment nodes 342 using a rigid connection 454.

Step 506 may also include transmitting, via one or more of the plurality of panel braces 400, the out-of-plane pressure load from the panel 300 to a common brace-bulkhead attachment location 218 on at least one of the side bulkheads 206. For example, FIGS. 8-9 show the panel braces 400 attached to the bulkhead top portion 210 of the side bulkheads 206 at a common brace-bulkhead attachment location 218. Similarly, the panel braces 400 are attached to the rib top portion 232 of the vessel ribs 230 at a common brace-rib attachment location 240. However, in an example not shown, the panel braces 400 may be attached to a side bulkhead 206 at vertically-spaced locations along the side bulkhead 206. Likewise, the panel braces 400 may be attached to a vessel rib 230 at vertically spaced locations along the vessel rib 230.

In some examples, the pressure vessel 200 may have a fail-safe configuration such that in the event of a failed brace 456 during internal pressurization 470 of the pressure vessel 200, the method 500 includes carrying, in one or more remaining panel braces 400 of the plurality of panel braces 400, an axial load higher than an axial load carried by any of the plurality of panel braces 400 when none have failed. The fail-safe configuration may prevent failure of the panel 300 that would otherwise occur due to bending deflections that cause panel bending in which the allowable bending stress of the panel 300 is exceeded. For example, as shown in FIG. 19, the panel 300 may be subjected to an excessively high bending load at the panel attachment node 342 coupled to the failed brace 456. In such a scenario, the remaining panel braces 400 may carry the axial load otherwise carried by the failed brace 456, and may thereby prevent failure of the panel 300.

In another example of the fail-safe configuration, the method 500 may include carrying, using a residual strength capability of a failed brace 456, an axial load capable of preventing failure of the panel 300. For example, as shown in FIG. 21, the failed brace 456 may be configured as a back-to-back pair of C-channels 458, either one of which has a residual axial strength capability and residual axial stiffness capability preventing failure of the panel 300 in the event that the remaining C-channel 458 develops a crack (e.g., a fatigue crack) and is incapable of carrying its designed axial load. In a still further example of the fail-safe configuration, the method may include carrying, in the panel 300, a bending load higher than the bending load carried by the panel 300 when none of the panel braces 400 have failed, for preventing failure of the panel 300 otherwise occurring due to bending deflection of the panel 300 that causes the allowable bending stress of the panel 300 to be exceeded. As indicated above, the bending load capability of the panel 300 may be described as the resistance of the panel 300 to global buckling of the panel 300.

Step 508 of the method 500 includes limiting, using the plurality of panel braces 400 based on an axial stiffness that is different among at least two of the panel braces 400, outward deflection of the panel attachment nodes 342 by substantially equal deflection amounts 346 (e.g., within 10 percent or less of each other) when internally pressurizing the pressure vessel 200. Advantageously, limiting outward deflection of the panel 300 by substantially equal amounts may reduce or prevent changes in the contour of the panel 300 during internal pressurization 470 of the pressure vessel 200. In addition, the use of panel braces 400 for coupling the panel 300 to the side bulkheads 206 instead of direct attachment of the panel 300 to the side bulkheads 206 and vessel ribs 230 (if included) may result in a decoupling of the out-of-plane pressure load (e.g., due to internal pressurization 470) and in-plane loads on the panel 300 (e.g., compression, tension and/or shear loads). In the example of a blended-wing-body aircraft 100, such in-plane loads may be flight loads that are the result of wing bending, or aerodynamic loads on the centerbody 110, or other factors.

The method 500 may include sealing the bulkhead top portion 210 of at least one of the side bulkheads 206 to the panel 300. The sealing of the panel 300 to a side bulkhead 206 may be performed using a pressure containment mechanism 472 configured to prevent leakage between the bulkhead top portion 210 and the panel 300 and thereby allow for internal pressurization 470 of the pressure vessel 200. In one example described above, the pressure containment mechanism 472 may include a pressure membrane 474 of material (e.g., a sheet of rubber, silicone, etc.) extending between the panel 300 and the side bulkhead 206 as shown in FIG. 13. In another example shown in FIG. 14, the pressure containment mechanism 472 may include a block 476 of elastomeric material (e.g., closed-cell foam) compressed and installed between the bulkhead top portion 210 and the panel 300. In a still further example shown in FIGS. 15-16, the pressure containment mechanism 472 may include a plate-seal assembly 478 having a first plate 480, a second plate 482, and a seal member 484 which may be a seal strip 486 captured between the first plate 480 and the second plate 482. In another example, the seal member 484 may be a bulb seal 490 such as an O-ring seal (FIG. 16) captured between the first plate 480 and the second plate 482.

Figure 36:
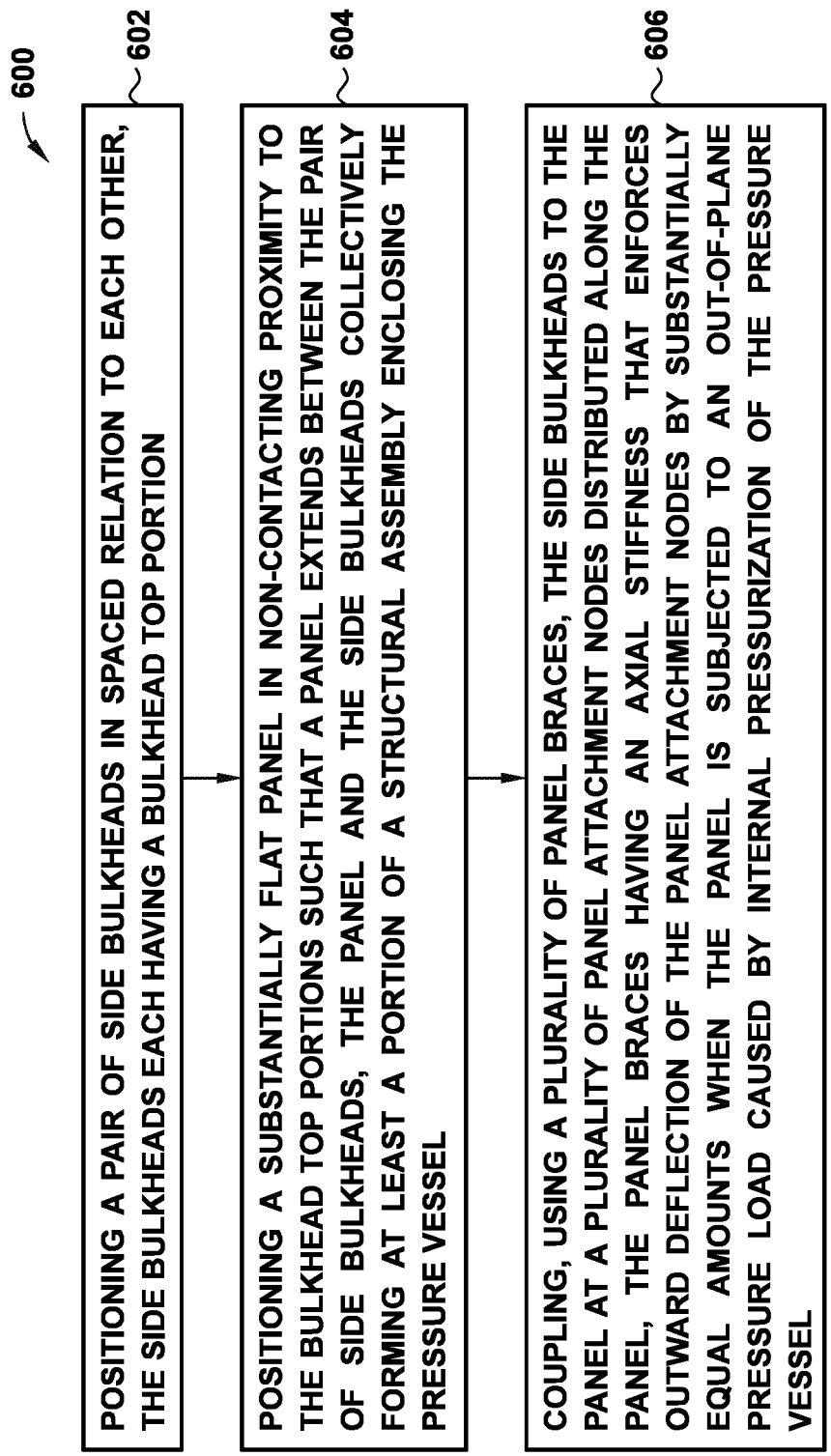
FIG. 36 is a flowchart of operations included in a method of manufacturing a pressure vessel.

FIG. 36 is a flowchart of operations included in a method 600 of manufacturing a pressure vessel 200. The method includes step 602 of positioning a pair of side bulkheads 206 in spaced relation to each other as shown in FIG. 4. As described above, the side bulkheads 206 each have a bulkhead top portion 210.

The method 600 additionally includes step 604 of positioning a substantially flat panel 300 in non-contacting proximity to the bulkhead top portions 210 such that a panel-bulkhead gap 214 exists between the panel 300 and each side bulkhead 206, and such that at least one panel span 324 extends between the pair of side bulkheads 206 as shown in FIG. 4. As mentioned above, the panel 300 and the side bulkheads 206 collectively form at least a portion of a structural assembly 198 enclosing the pressure vessel 200. In some examples, step 604 of positioning a pair of side bulkheads 206 in spaced relation to each other may include orienting the side bulkheads 206 parallel to each other (e.g., FIG. 2). However, in examples not shown, the side bulkheads 206 may be non-parallel to each other.

In some examples, the pressure vessel 200 may be a passenger cabin 112 and/or a cargo hold 114 associated with the centerbody 110 of a blended-wing-body aircraft 100 (e.g., FIGS. 1-3) as described above. The panel 300 may be an upper skin panel of the centerbody 110 and may define an aerodynamic surface 116 of the centerbody 110. Additionally, the upper skin panel may be subjected to flight loads (e.g., as a result of wing bending, aerodynamic loads on the centerbody 110, or other loads) during pressurization of the passenger cabin 112 and/or cargo hold 114.

The method 600 also includes step 606 of coupling, using a plurality of panel braces 400, each one of the side bulkheads 206 to the panel 300 at a plurality of panel attachment nodes 342 distributed along the panel span 324. As described above, at least two of the panel braces 400 have a different axial stiffness that results in or limits outward deflection of the panel attachment nodes 342 by substantially equal deflection amounts 346 when the panel 300 is subjected to an out-of-plane pressure load during internal pressurization 470 of the pressure vessel 200. The method may also include coupling, using a plurality of panel braces 400, at least one end bulkhead 208 (FIG. 2) to the panel 300 using a plurality of panel attachment nodes 342, as mentioned above.

The method 600 may also include positioning at least one vessel rib 230 between the pair of side bulkheads 206. For example, FIG. 4 illustrates two (2) vessel ribs 230 positioned between the pair of side bulkheads 206 although a pressure vessel 200 may include any number of vessel ribs 230. The vessel ribs 230 are configured such that the panel 300 is in non-contacting proximity to a rib top portion 232 of each vessel rib 230, and resulting in a panel-rib gap 236 between the panel 300 and each vessel rib 230. The method may additionally include coupling each vessel rib 230 to the panel 300 using a plurality of panel braces 400. For example, the plurality of panel braces 400 may extend from the rib top portion 232 to a corresponding plurality of panel attachment nodes 342 distributed along the panel 300 as shown in FIG. 4.

Step 606 of coupling each side bulkhead 206 to the panel 300 may include coupling the side bulkheads 206 to the panel 300 using a plurality of panel braces 400, at least two of which have a cross-sectional area and/or an elastic modulus that is different respectively than the cross-sectional area or elastic modulus of the remaining panel braces 400. As described above, the axial stiffness of a panel brace 400 may be varied by varying the cross-sectional area and/or the elastic modulus of the panel brace 400. The elastic modulus of a panel brace 400 may be varied by varying the material from which the panel brace 400 is formed. In some examples, step 606 of coupling each of the side bulkheads 206 to the panel 300 at the plurality of panel attachment nodes 342 may include coupling the panel attachment node 342 nearest one of the side bulkheads 206 using a panel brace 400 having a lower axial stiffness than the remaining panel braces 400 coupling the side bulkhead 206 to the panel 300. For example, in FIGS. 17-18, the first panel brace 402 may have a lower axial stiffness than the second panel brace 404 through the fifth panel brace 410. The first panel brace 402 may be configured to have a relatively low axial stiffness due to a relatively low bending moment in the panel 300 at the panel attachment node 342 to which the first panel brace 402 is coupled.

Step 606 of coupling the side bulkheads 206 to the panel 300 at a plurality of panel attachment nodes 342 may include connecting each one of the panel braces 400 to a panel attachment node 342 using a pinned connection 452 (e.g., FIG. 9) or a rigid connection 454 (e.g., FIGS. 12-13). As described above, a pinned connection 452 allows for rotation of the panel 300 relative to the panel brace 400 at the panel attachment node 342, and a rigid connection 454 prevents rotation of the panel 300 relative to the panel brace 400 at the panel attachment node 342. A pinned connection 452 or a rigid connection 454 may also be used to attach a panel brace 400 to a side bulkhead 206 at a brace-bulkhead attachment location 218 or to vessel rib 230 at a brace-rib attachment location 240 as shown in FIGS. 8-11.

Step 606 of coupling the side bulkheads 206 to the panel 300 at the panel attachment nodes 342 may include attaching at least two of the panel braces 400 to a common brace-bulkhead attachment location 218 (FIG. 13) or to a common brace-rib attachment location 240 (e.g., FIG. 9). In addition, one or more of the panel braces 400 may be attached to a side bulkhead 206 or to a vessel rib 230 using either a pinned connection 452 or a rigid connection 454.

In some examples, step 606 of coupling the side bulkheads 206 to the panel 300 may include coupling a side bulkhead 206 to the panel 300 using at least one panel brace 400 having an axial strength capability preventing failure (e.g., buckling) of the panel 300 in the event of a failure of another one of the panel braces 400. A failed brace 456 (FIG. 19) may be described as being incapable of carrying axial load. As mentioned above, panel failure may include buckling of the panel 300 due to excessive deflection of the panel 300 proximate the panel attachment node 342 of the failed brace 456. In another example, step 606 may include coupling a side bulkhead 206 to the panel 300 using at least one panel brace 400 having a residual axial strength capability and residual axial stiffness capability preventing failure of the panel 300 in the event of a failure of the same panel brace 400. For example, the panel brace 400 may be configured as a pair of back-to-back brace members such as back-to-back C-channels 458. If one of the C-channels 458 develops a fatigue crack, the remaining C-channel 458 may have a residual axial strength capability and residual axial stiffness capability preventing failure of the panel 300. Although FIG. 21 illustrates the panel brace 400 as back-to-back C-channels 458, the panel brace 400 may be provided in any one of a variety of configurations having a residual axial strength and residual axial stiffness capability preventing failure of the panel 300 in the event of a failure of the same panel brace 400.

In a still further example of a fail-safe configuration of the pressure vessel 200, step 606 may include coupling a side bulkhead 206 to a panel 300 having a bending load capability value that is higher than the bending load carried by the panel 300 when none of the panel braces 400 have failed. In this regard, if one of the panel braces 400 fails, the panel 300 may have a bending load carrying capability allowing the panel 300 to withstand an additional bending load imposed on the panel 300 as a result of the failed brace 456. For any one of the above-described fail-safe configurations, the pressure vessel 200 may include a structural health monitoring system (not shown) configured to monitor and detect the failure of any one of the panel braces 400. In the event that the failure of one of the panel braces 400 is detected, the structural health monitoring system may allow for limiting the operation of the pressure vessel 200 in a manner to reduce the magnitude of external loads on the pressure vessel 200 for preventing failure of the panel 300. In the example of an aircraft 100 (e.g., FIGS. 1-3) having a pressurized passenger cabin 112 (e.g., a pressure vessel 200), a structural health monitoring system may include a system of sensors (e.g., strain gauges, accelerometers, electrical continuity sensors) mounted on each of the panel braces 400 for detecting a failure of the panel braces 400. Upon identifying a failure of one or more of the panel braces 400, the structural health monitoring system may result in operating the aircraft 100 in a manner to reduce external loads (e.g., in-flight loads) on the aircraft 100 until the aircraft 100 lands and the panel braces 400 are repair or replaced.

The method 600 may further include sealing, using a pressure containment mechanism 472, the panel 300 to at least one of the side bulkheads 206. For example, the pressure containment mechanism 472 may extend between the panel 300 and a bulkhead top portion 210 of a side bulkhead 206. The pressure containment mechanism 472 may prevent leakage between the side bulkhead 206 and the panel 300 and thereby allow for internal pressurization 470 of the pressure vessel 200. The pressure containment mechanism 472 may be provided in a wide variety of configurations, including one or more of the configurations described above.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A pressure vessel, comprising:
   at least one pair of side bulkheads spaced apart from each other and each having a bulkhead top portion;
   at least one substantially flat panel having at least one panel span extending between the pair of side bulkheads and being in non-contacting proximity to the bulkhead top portions, the panel and the side bulkheads collectively forming at least a portion of a structural assembly enclosing the pressure vessel; and
   a first plurality of panel braces coupling each of the side bulkheads to the panel at a corresponding first plurality of panel attachment nodes distributed along the panel span, at least two of the panel braces of the first plurality of panel braces having a different axial stiffness configured to result in an outward deflection of the first plurality of panel attachment nodes by substantially equal deflection amounts when the panel is subjected to an out-of-plane pressure load during internal pressurization of the pressure vessel.

2. The pressure vessel of claim 1, further including:
   at least one vessel rib located between the pair of side bulkheads and having a rib top portion in non-contacting proximity to the panel; and
   the at least one vessel rib coupled to the panel using a second plurality of panel braces extending from the rib top portion to a second plurality of panel attachment nodes distributed along the panel.

3. The pressure vessel of claim 1, wherein at least one panel brace of the first plurality of panel braces coupling one of the side bulkheads to the panel has at least one of the following configurations:
   a cross-sectional area and a corresponding axial stiffness that is different than a cross-sectional area and a corresponding axial stiffness of one or more of the remaining panel braces of the first plurality of panel braces coupling the pair of side bulkheads to the panel; and
   an elastic modulus and a corresponding axial stiffness that is different than an elastic modulus and a corresponding axial stiffness of one or more of the remaining panel braces of the first plurality of panel braces coupling the pair of side bulkheads to the panel.

4. The pressure vessel of claim 1, wherein:
   a panel brace of the first plurality of panel braces coupling one of the side bulkheads to the panel at a panel attachment node of the first plurality of panel attachment nodes nearest the one of the side bulkheads has a lower stiffness than the remaining first plurality of panel braces coupling the one of the side bulkheads to the panel.

5. The pressure vessel of claim 1, wherein:
   the first plurality of panel attachment nodes are non-uniformly spaced along the at least one panel span.

6. The pressure vessel of claim 1, wherein:
at least two of the first plurality of panel braces extending from one of the at least one pair of side bulkheads are attached to the bulkhead top portion at a single brace-bulkhead attachment location.

7. The pressure vessel of claim 1, further including:
at least one pressure containment mechanism configured to seal the panel to at least one of the pair of side bulkheads for internal pressurization of the pressure vessel.

8. The pressure vessel of claim 1, wherein:
at least one of the panel and the first plurality of panel braces is configured for fail-safety to prevent failure of the panel in event of a failure of one of the first plurality of panel braces.

9. The pressure vessel of claim 8, wherein the fail-safe configuration comprises at least one of the following:
at least one of the first plurality of panel braces has an axial strength capability to prevent failure of the panel in event of a failure of another one of the first plurality of panel braces;
at least one of the first plurality of panel braces has a residual axial strength and a residual axial stiffness capability to prevent failure of the panel in event of a failure of the at least one of the first plurality of panel braces; and
the panel has a bending load capability to prevent failure of the panel in event of a failure of one of the first plurality of panel braces.

10. The pressure vessel of claim 1, wherein:
the pressure vessel comprises at least one of a passenger cabin and a cargo hold of an aircraft; and
the panel comprising a skin panel defining an aerodynamic surface of the aircraft and configured to sustain flight loads during pressurization of at least one of the passenger cabin and the cargo hold.

11. A method of loading a pressure vessel, comprising:
internally pressurizing the pressure vessel at least partially enclosed by a panel having at least one panel span extending between a pair of side bulkheads each having a bulkhead top portion in non-contacting proximity to the panel;
generating an out-of-plane pressure load on the panel in response to internally pressurizing the pressure vessel;
transmitting the out-of-plane pressure load from the panel to the pair of side bulkheads using a first plurality of panel braces coupling individual ones of the side bulkheads to the panel at a first plurality of panel attachment nodes distributed along the at least one panel span; and
limiting an outward deflection of the first plurality of panel attachment nodes to substantially equal deflection amounts when internally pressurizing the pressure vessel, the outward deflection being limited by the first plurality of panel braces having an axial stiffness that is different among at least two of the panel braces of the first plurality of panel braces.

12. The method of claim 11, further comprising:
transmitting the out-of-plane pressure load from the panel to at least one vessel rib using a second plurality of panel braces coupling a rib top portion to a second plurality of panel attachment nodes distributed along the at least one panel span, the at least one vessel rib located between the pair of side bulkheads and being in non-contacting proximity to the panel.

13. The method of claim 11, wherein transmitting the out-of-plane pressure load from the panel to the pair of side bulkheads includes:
transmitting the out-of-plane pressure load using at least one panel brace of the first plurality of panel braces having at least one of the following configurations:
a cross-sectional area and a corresponding axial stiffness that is different than a cross-sectional area and a corresponding axial stiffness of one or more of the remaining panel braces of the first plurality of panel braces coupling the pair of side bulkheads to the panel; and
an elastic modulus and a corresponding axial stiffness that is different than an elastic modulus and a corresponding axial stiffness of one or more of the remaining panel braces of the first plurality of panel braces coupling the pair of side bulkheads to the panel.

14. The method of claim 11, wherein in event of a failed brace among the first plurality of panel braces, the method further comprising at least one of the following:
carrying, in one or more remaining panel brace of the first plurality of panel braces, an axial load higher than an axial load carried by any of the first plurality of panel braces when none have failed, for preventing failure of the panel due to buckling;
carrying an axial load in the failed brace capable of preventing failure of the panel; and
carrying, in the panel, a bending load higher than a bending load carried by the panel when none of the first plurality of panel braces have failed, for preventing failure of the panel due to buckling.

15. The method of claim 11, wherein the pressure vessel comprises at least one of a passenger cabin and a cargo hold of an aircraft, the panel comprising an aerodynamic surface, the method further comprising:
sustaining, using the panel, flight loads imparted upon the panel during pressurization of at least one of the passenger cabin and the cargo hold.

16. A method of manufacturing a pressure vessel, comprising:
positioning a pair of side bulkheads in a spaced relation to each other, the pair of side bulkheads each having a bulkhead top portion;
positioning a substantially flat panel in non-contacting proximity to the bulkhead top portion of each of the pair of side bulkheads such that at least one panel span extends between the pair of side bulkheads, the panel and the pair of side bulkheads collectively forming at least a portion of a structural assembly enclosing the pressure vessel; and
coupling, using a first plurality of panel braces, each of the side bulkheads to the panel at a corresponding first plurality of panel attachment nodes distributed along the panel span, at least two of the panel braces of the first plurality of panel braces having a different axial stiffness that results in an outward deflection of the first plurality of panel attachment nodes by substantially equal deflection amounts when the panel is subjected to an out-of-plane pressure load during internal pressurization of the pressure vessel.

17. The method of claim 16, further including:
positioning at least one vessel rib between the pair of side bulkheads such that the panel is in non-contacting proximity to a rib top portion; and
coupling the at least one vessel rib to the panel using a second plurality of panel braces extending from the rib top portion to a second plurality of panel attachment nodes distributed along the panel.

18. The method of claim 16, wherein coupling each of the side bulkheads to the panel at the first plurality of panel attachment nodes includes:
- coupling each of the side bulkheads to the first plurality of panel attachment nodes, wherein the first plurality of panel attachment nodes are non-uniformly spaced along the panel span.

19. The method of claim 16, wherein coupling each of the side bulkheads to the panel at the first plurality of panel attachment nodes includes:
- coupling the side bulkheads to the panel using the first plurality of panel braces having at least one of the following configurations:
  - a cross-sectional area and a corresponding axial stiffness that is different than a cross-sectional area and a corresponding axial stiffness of one or more of the remaining panel braces of the first plurality of panel braces coupling the panel to the pair of side bulkheads; and
  - an elastic modulus and a corresponding axial stiffness that is different than an elastic modulus and a corresponding axial stiffness of one or more of the remaining panel braces of the first plurality of panel braces coupling the panel to the pair of side bulkheads.

20. The method of claim 16, wherein coupling each of the side bulkheads to the panel at the first plurality of panel attachment nodes includes at least one of the following:
- coupling the pair of side bulkheads to the panel using one or more panel braces of the first plurality of panel braces having an axial strength capable of preventing failure of the panel in event of a failed panel brace of the first plurality of panel braces;
- coupling the pair of side bulkheads to the panel using at least one panel brace of the first plurality of panel braces having a residual axial strength capability and a residual axial stiffness capability to prevent failure of the panel in event of a failure of the same panel brace; and
- coupling the pair of side bulkheads to the panel having a bending load capability value higher than a bending load carried by the panel when none of the panel braces of the first plurality of panel braces have failed.

* * * * *